US011412520B2

(12) United States Patent
Zhang et al.

(10) Patent No.: US 11,412,520 B2
(45) Date of Patent: Aug. 9, 2022

(54) COMMUNICATION METHOD, APPARATUS, AND SYSTEM

(71) Applicant: Huawei Technologies Co., Ltd., Shenzhen (CN)

(72) Inventors: Xu Zhang, Beijing (CN); Yan Cheng, Beijing (CN); Jianguo Wang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 114 days.

(21) Appl. No.: 16/915,838

(22) Filed: Jun. 29, 2020

(65) Prior Publication Data
US 2020/0329477 A1    Oct. 15, 2020

Related U.S. Application Data

(63) Continuation of application No. PCT/CN2018/123658, filed on Dec. 25, 2018.

(30) Foreign Application Priority Data

Dec. 29, 2017   (CN) .......................... 201711489452.0
Jan. 22, 2018   (CN) .......................... 201810060582.0

(51) Int. Cl.
*H04W 72/04*      (2009.01)
*H04L 1/00*       (2006.01)

(52) U.S. Cl.
CPC ....... *H04W 72/0493* (2013.01); *H04L 1/0071* (2013.01); *H04W 72/042* (2013.01); *H04W 72/0446* (2013.01); *H04W 72/0453* (2013.01)

(58) Field of Classification Search
CPC ........... H04W 72/0493; H04W 72/042; H04W 72/0446; H04W 72/0453; H04L 1/0071
See application file for complete search history.

(56) References Cited

U.S. PATENT DOCUMENTS

2012/0281554 A1    11/2012   Gao et al.
2014/0016582 A1    1/2014    Prakash et al.
(Continued)

FOREIGN PATENT DOCUMENTS

CN    101594215 A    12/2009
CN    102457910 A    5/2012
(Continued)

OTHER PUBLICATIONS

U.S. Appl. No. 62/556,320, filed Sep. 8, 2017, not in English, pp. 1-18. (Year: 2017).*
(Continued)

*Primary Examiner* — Melvin C Marcelo
(74) *Attorney, Agent, or Firm* — Leydig, Voit & Mayer, Ltd.

(57) ABSTRACT

This application relates to the field of wireless communications, and in particular, to a communication method, an apparatus, and a system in a wireless communications system. In the method, a network device and a terminal device determine M resource element group bundles in a control resource set. The network device sends a control channel on resources corresponding to the M resource element group bundles. The terminal device detects the control channel on the resources corresponding to the M resource element group bundles, where M is greater than or equal to 1. The control resource set includes B resource element group resource element group bundles. By using the method, resource configuration efficiency in a communications system is improved.

17 Claims, 7 Drawing Sheets

(56) References Cited

U.S. PATENT DOCUMENTS

| | | | |
|---|---|---|---|
| 2015/0023290 | A1 | 1/2015 | Tang et al. |
| 2017/0257860 | A1 | 9/2017 | Nam et al. |
| 2017/0273058 | A1 | 9/2017 | Agiwal et al. |
| 2021/0227525 | A1* | 7/2021 | Khoshnevisan .... H04W 72/042 |
| 2021/0314114 | A1* | 10/2021 | Seo ........................ H04L 5/0092 |

FOREIGN PATENT DOCUMENTS

| | | |
|---|---|---|
| CN | 102665230 A | 9/2012 |
| CN | 102711253 A | 10/2012 |
| CN | 103202080 A | 7/2013 |
| CN | 107465483 A | 12/2017 |

OTHER PUBLICATIONS

U.S. Appl. No. 62/556,320, filed Feb. 27, 2020, English translation, pp. 1-18. (Year: 2020).*

"3rd Generation Partnership Project; Technical Specification Group Radio Access Network; NR; Physical channels and modulation (Release 15)," 3GPP TS 38.211 V1.3.0, pp. 1-73, 3rd Generation Partnership Project, Valbonne, France (Dec. 2017).

Lien et al., "5G New Radio: Waveform, Frame Structure, Multiple Access, and Initial Access," IEEE Communications Magazine, vol. 55, Issue: 6, pp. 64-71, Institute of Electrical and Electronics Engineers, New York ,New York (Jun. 2017).

Hui et al., "User-centric 5G access network," Proceedings of the 2015 LTE Network Innovation Symposium, total 7 pages (Aug. 20, 2015). With English abstract.

ETRI, "NR-PDCCH mapping structure and REG bundle size," 3GPP TSG RAN WG1 NR Ad-Hoc#2, Qingdao, China, R1-1710614, total 6 pages, 3rd Generation Partnership Project, Valbonne, France (Jun. 27-30, 2017).

"On PDCCH structure," 3GPP TSG RAN WG1 Meeting 90bis, Prague, CZ, R1-1717641, pp. 1-8, 3rd Generation Partnership Project, Valbonne, France (Oct. 9-13, 2017).

"On NR-PDCCH structure," 3GPP TSG RAN WG1 Meeting #91, Reno, USA, R1-1719386, pp. 1-7, 3rd Generation Partnership Project, Valbonne, France (Nov. 27-Dec. 1, 2017).

* cited by examiner

COMMUNICATION METHOD, APPARATUS, AND SYSTEM

CROSS-REFERENCE TO RELATED APPLICATIONS

This application is a continuation of International Application No. PCT/CN2018/123658, filed on Dec. 25, 2018, which claims priority to Chinese Patent Application No. 201810060582.0, filed on Jan. 22, 2018 and Chinese Patent Application No. 201711489452.0, filed on Dec. 29, 2017. The disclosures of the aforementioned applications are hereby incorporated by reference in their entireties.

TECHNICAL FIELD

The present embodiments relate to the field of wireless communications, and in particular, to a configuration of a resource block set in a wireless communications system.

BACKGROUND

In an existing long term evolution (LTE) system, there are two types of control channels: a physical downlink control channel (PDCCH) and an enhanced physical downlink control channel (EPDCCH). In time domain, a time-frequency resource area in which the PDCCH is located in the first 0 to 3 orthogonal frequency division multiplexing (OFDM) symbols of a subframe, and a time-frequency resource area in which the EPDCCH is located occupies all or some downlink OFDM symbols except for the symbols occupied by the PDCCH in the subframe. In frequency domain, a time-frequency area in which the PDCCH is located occupies an entire system bandwidth, and a time-frequency area in which the EPDCCH is located occupies a frequency domain width of at least one physical resource block (PRB) in frequency domain.

In a next-generation wireless communications system, for example, in a new radio (NR) system, downlink control information carried on a control channel is used to indicate a frequency domain position, in a data area, of a resource block (RB) used by a data channel, and the data channel is used to carry downlink data.

To improve efficiency of blindly detecting the control channel by a terminal device, a concept of a control resource set (control resource set, referred to as COREST below) is proposed in a process of formulating an NR standard. In other words, one or more control resource sets are allocated to each terminal device in a control area. A network device may send a downlink control channel to the terminal device on any control resource set corresponding to the terminal device. The downlink control channel includes one or more control channel elements (CCE), and the downlink control channel element CCE is mapped to the CORESET. The control resource set includes consecutive or discrete frequency domain resources in frequency domain, and includes a plurality of consecutive OFDM symbols in time domain. One control channel element (CCE) includes a plurality of resource element groups (REG).

In a process of mapping the CCE to the CORESET, because the CORESET includes the consecutive or discrete frequency domain resources in frequency domain, different CCEs may be mapped to a same resource, thereby causing a failure in receiving and sending control information. Therefore, how to implement mapping from the CCE to the CORESET, and accurate and efficient resource configuration is a technical problem that urgently needs to be resolved.

SUMMARY

The present embodiments relate to a communication method, an apparatus, and a system, to implement accurate and efficient resource configuration in a communications system.

According to a first aspect, an embodiment of this application provides a communication method, where the method includes:

determining, by a terminal device, M resource element group bundles in a control resource set; and detecting, by the terminal device, a control channel on resources corresponding to the M resource element group bundles, where M is greater than or equal to 1.

In the following optional designs, parameters are explained as follows: N is a quantity of resource element groups included in the control resource set, B is a quantity of resource element group bundles included in the control resource set, L is a size of a resource element group bundle, R is an interleaving parameter, $N_{null}=(C \cdot R-B)$, $C=\lceil B/R \rceil$, $x=cR+r$, $r \in \{0, 1, \ldots, R-1\}$ (when an interleaving matrix is introduced, r is also referred to as a row number), and $c \in \{0, 1, \ldots, C-1\}$ (when the interleaving matrix is introduced, c is also referred to as a column number).

In an optional design, the control resource set includes B resource element group resource element group bundles; and the determining, by a terminal device, M resource element group bundles in a control resource set includes:

determining, by the terminal device, the M resource element group bundles based on at least one offset value and/or shift value, where the at least one offset value and/or shift value are/is determined based on a value of $((\lceil B/R \rceil \cdot R)-B)$, a value of B is less than or equal to $((\lceil B/R \rceil \cdot R)$, and R is an interleaving parameter obtained by the terminal device.

Optionally, the at least one offset value is determined based on at least one of the value of $((\lceil B/R \rceil \cdot R)-B)$, the row number r, and the column number c.

In an optional design, the at least one offset value includes at least one of an offset1, an offset2, an offset3, an offset4, an offset5, and an offset6; and the determining, by the terminal device, the M resource element group bundles based on at least one offset value includes:

determining, by the terminal device, that an index of an $(i+1)^{th}$ resource element group bundle in a $(j+1)^{th}$ control channel element of the control resource set is f(x), where a value of x is equal to $(6j/L+i)$, L is a size of a resource element group bundle, and a value of f(x) meets one of the following formulas:

$f(x)=g(x+\text{offset1})$;

$f(x)=(rC+c+n_{shift}) \bmod B$, where $x=cR+r-\text{offset1}$;

$f(x)=(h(x)-\text{offset2}) \bmod B$, or $f(x)=h(x)-\text{offset2}$;

$f(x)=((x \bmod R) \cdot C+\lfloor x/C \rfloor-\text{offset2}+n_{shift}) \bmod B$;

$f(x)=(h(x)+\text{offset3}) \bmod B$, or $f(x)=h(x)+\text{offset3}$;

$f(x)=((x \bmod R) \cdot C+\lfloor x/C \rfloor+\text{offset3}+n_{shift}) \bmod B$; and $f(x)=(r \cdot C+c+n_{shift}+\text{offset4}) \mod B$, and $cR+r+\text{offset5}=x$, where $g(z)=h(z) \mod B$, or $g(z)=h(z)$, and $x,z$, the offset1, the offset2, the offset3, the offset4, and the offset5 are integers.

In an optional design, offset1=n, and $a_n \leq x < a_{n+1}$, where $n \in \{0, 1, \ldots N_{null}-1\}$, and $$a_n = \begin{cases} 0, n = 0 \\ R \cdot (C - N_{null}) + n(R-1), n \neq 0 \end{cases}.$$

Further, optionally, $N_{null}$ is not 0, and is less than C.

In an optional design, offert1=$n \cdot W_n$, $f(x)=g(x+n \cdot W_n)$, and a value of n meets $b_n \leq x < b_{n+1}$ and $n \in \{0, 1, \ldots, C-1\}$, where $$W_n = \begin{cases} \lfloor N_{null}/C \rfloor, n \in \{0, 1, \ldots, Q-1\} \\ \lceil N_{null}/C \rceil, n \in \{Q, Q+1, \ldots, C-1\} \end{cases},$$

$Q = C \cdot \lceil N_{null}/C \rceil - N_{null}$, and $$b_n = \begin{cases} 0, n = 0 \\ nR - \sum_{s=1}^{n} W_s, n \neq 0 \end{cases}.$$

It should be noted that n in the optional design has a different meaning from n in the previous optional design.

In an optional design, the at least one offset value is determined based on the value of $((\lceil B/R \rceil \cdot R)-B)$.

Optionally, a value of the offset2 meets offset2=$N_{null}$, where $N_{null}$ meets $N_{null}=((\lceil B/R \rceil \cdot R)-B)$.

In an optional design, the at least one offset value is determined based on the value of $((\lceil B/R \rceil \cdot R)-B)$ and the row number r.

Optionally, offset2=$\max\{0, r-(R-N_{null})\}$, or offset2=$\max\{0, (x \mod R)-(R-N_{null})\}$.

In an optional design, the at least one offset value is determined based on the value of $((\lceil B/R \rceil \cdot R)-B)$, the row number r, and the column number c.

Optionally, $$\text{offset } 2 = \begin{cases} \min\{r, N_{null}\}, c \neq C-1 \\ \min\{r + N_{null}, N_{null}\} - C \cdot N_{null}, c = C-1 \end{cases}.$$

In an optional design, the at least one offset value is determined based on the value of $((\lceil B/R \rceil \cdot R)-B)$ and the row number r.

Optionally, offset3=$\min\{0, (R-N_{null}-r)\}$, or offset3=$\min\{0, (R-N_{null})-(x \mod R)\}$.

In an optional design, the at least one offset value is determined based on the value of $((\lceil B/R\ R)-B)$, the row number r, and the column number c.

Optionally, $$\text{offset } 3 = \begin{cases} \max\{-r, -N_{null}\}, c \neq C-1 \\ C \cdot N_{null} + \max\{-(r + N_{null}), -N_{null}\}, c = C-1 \end{cases}.$$

In an optional design, a value of h(x) meets $h(x)=u(x)+n_{shift}$, and a value of u(x) is equal to $(r \cdot C+c)$ where $x=cR+r$, a value of $n_{shift}$ is $A \cdot n_{id} \cdot (N_{symbol}/L)$, A is an offset parameter obtained by the terminal device, $n_{id}$ is identification information obtained by the terminal device, and $N_{symbol}$ is a quantity of symbols occupied by the control resource set in time domain.

In an optional design, a value of h(x) meets $h(x)=u(k)$, where a value of u(k) is equal to $(r \cdot C+c)$, a value of k meets $k=(x+n_{shift}) \mod (B)$  $k=(x-n_{shift}) \mod (B)$, $x=(k+n_{shift}) \mod (B)$, or $x=(k-n_{shift}) \mod (B)$, and values of c and r meet $k=cR+r$, or $k=cR+r+\text{offset6}$, where $n_{shift}$ is a shift value determined by the terminal device.

In an optional design, an $m^{th}$ location $e_{null}(m)$ in $N_{null}$ row locations meets the following formula:

$$e_{null}(m) = R - \left\lfloor \frac{(N_{null} - m) \cdot R}{N_{null}} \right\rfloor - 1,$$

where $m \in \{1, 2, \ldots N_{null}\}$.

Alternatively, an $(m+1)^{th}$ location $e_{null}(m)$ in $N_{null}$ row locations meets the following formula:

$$e_{null}(m) = \left\lfloor \frac{m \cdot R}{N_{null}} \right\rfloor,$$

where $m \in \{0, 1, 2, \ldots N_{null}-1\}$.

Optionally, a value of the offset4 is $-m$, $e_{null}(m) \leq r < e_{null}(m+1)$.

Further, optionally, a value of the offset5 is $$\begin{cases} -\left\lfloor \frac{c}{C-1} \right\rfloor m, \text{otherwise} \\ -2 \cdot \left\lfloor \frac{c}{C-1} \right\rfloor m, N_{null} = 4 \end{cases}, e_{null}(m) \leq r < e_{null}(m+1).$$

Optionally, a value of the offset4 meets offset4=$-N_{null}$, where $N_{null}$ meets $N_{null}=((\lceil B/R \rceil \cdot R)-B)$.

Further, optionally, when $c \in \{0, 1, 2, \ldots, -1\}$, a value of the offset5 meets offset5=$(-c-1)$, where $r \in \{1, \ldots, (R-1)\}$; and/or when $c \in \{N_{null}, N_{null}+1, \ldots, C-1\}$, a value of the offset5 meets offset5=$-N_{null}$, where $r \in \{0, 1, \ldots, (R-1)\}$.

In an optional design, when $c \in \{0, 1, 2, \ldots, N_{null}-1\}$, a value of the offset6 meets offset6=$(-c-1)$, where $r \in \{1, 2, \ldots, R-1\}$; and/or when $c \in \{N_{null}, N_{null}+1, \ldots, C-1\}$, a value of the offset6 meets offset6=$-N_{null}$, where $r \in \{0, 1, 2, \ldots, R-1\}$.

In an optional design, the determining, by a terminal device, M resource element group bundles in a control resource set includes: further determining, by the terminal device, the M resource element group bundles based on the at least one shift value. The at least one shift value includes the foregoing $n_{shift}$. A value of $n_{shift}$ may be determined by using at least one parameter, and the parameter may be at least one of an offset parameter A, an offset parameter Z, and identification information $n_{id}$.

Optionally, the value of $n_{shift}$ may be determined by using the offset parameter A or Z, and the offset parameters A and Z are determined by using a parameter P. Further, optionally, a value of A is equal to a value of P, a value of Z is equal to $(N_{symbol}/L) \cdot A$, and $N_{symbol}$ is a quantity of OFDM symbols occupied by the control resource set in time domain.

Optionally, the value of $n_{shift}$ may be determined by using the identification cell information $n_{id}$. The identification information may be a cell identifier $N_{ID}^{cell}$ or a parameter configured by using higher layer signaling.

Optionally, the value of $n_{shift}$ may be determined by using the offset parameter A and the identification information $n_{id}$, or may be determined by using the offset parameter Z and the identification information $n_{id}$.

For example, the value of $n_{shift}$ meets $n_{shift}=A \cdot (N_{symbol}/L) \cdot \lfloor n_{id}/(A \cdot (N_{symbol}/L)) \rfloor$, $n_{shift}=A \cdot (N_{symbol}/L) \cdot \lceil n_{id}/(A \cdot (N_{symbol}/L)) \rceil$, or $n_{shift} \mod(A)=0$.

For another example, the value of $n_{shift}$ meets $n_{shift}=A \cdot (N_{symbol}/L) \cdot \lfloor n_{id}/(A \cdot (N_{symbol}/L)) \rfloor + N_{null}$, or $n_{shift}=A \cdot (N_{symbol}/L) \cdot \lceil n_{id}/(A \cdot (N_{symbol}/L)) \rceil - N_{Null}$.

For another example, the value of $n_{shift}$ meets $n_{shift}=Z \cdot \lfloor n_{id}/Z \rfloor$, $n_{shift}=Z \cdot \lceil n_{id}/Z \rceil$, or $n_{shift} \mod(Z)=0$.

For another example, the value of $n_{shift}$ meets $n_{shift}=A \cdot (N_{symbol}/L) \cdot n_{id}$, or $n_{shift}=Z \cdot n_{id}$.

In an optional design, the network device and the terminal device determine that a number of an $(i+1)^{th}$ REG bundle in a $(j+1)^{th}$ control channel element CCE of the control resource set is f(x), where a value of x is equal to $(6j/L+i)$, a value of f(x) meets $f(x)=(rC+c+n_{shift}) \mod(C \cdot R)$, or $f(x)=(rC+c+n_{shift}) \mod B$, $x \in \{, 1, 2, 3, \ldots, C \cdot R-1\}$, and a value set of f(x) is B numbers that are different from each other and that are less than B.

It should be noted that, when the method can be used to determine the resource element group bundles, one or more of the foregoing optional designs may be combined with each other.

According to the first aspect, an embodiment of this application further provides a wireless apparatus, where the wireless apparatus may be applied to a terminal device or a network device, and the apparatus includes a processing unit. The processing unit determines M resource element group bundles in a control resource set; and the processing unit detects a control channel on resources corresponding to the M resource element group bundles, where M is greater than or equal to 1. Optionally, the apparatus further includes a receiving unit, and the receiving unit is configured to receive the control channel. Optionally, the apparatus further includes a transmitting unit.

In an optional design, the control resource set includes B resource element group resource element group bundles; and the processing unit determines the M resource element group bundles based on at least one offset value and/or shift value, where the at least one offset value and/or shift value are/is determined based on a value of $((\lceil B/R \rceil \cdot R)-B)$, a value of B is less than or equal to $(\lceil B/R \rceil \cdot R)$ and R is an interleaving parameter obtained by the processing unit or the terminal device.

Optionally, the at least one offset value and/or shift value are/is determined based on at least one of the value of $((\lceil B/R \rceil \cdot R)-B)$, a row number r, and a column number c.

In an optional design, the at least one offset value includes at least one of an offset1 an offset2, an offset3, an offset4, an offset5, and an offset6; and that the processing unit determines the M resource element group bundles based on at least one offset value includes:

the processing unit determines that an index of an $(i+1)^{th}$ resource element group bundle in a $(j+1)^{th}$ control channel element of the control resource set is f(x), where a value of x is equal to $(6j/L+i)$, L is a size of a resource element group bundle, and a value of f(x) meets one of the following formulas:

$$f(x)=g(x+\text{offset1});$$

$$f(x)=(rC+c+n_{shift}) \mod B, \text{ where } x=cR+r-\text{offset1};$$

$$f(x)=(h(x)-\text{offset2}) \mod B, \text{ or } f(x)=h(x)-\text{offset2};$$

$$f(x)=((x \mod R) \cdot C+\lfloor x/C \rfloor-\text{offset2}+n_{shift}) \mod B;$$

$$f(x)=(h(x)+\text{offset3}) \mod B, \text{ or } f(x)=h(x)+\text{offset3};$$

$$f(x)=((x \mod R) \cdot C+\lfloor x/C \rfloor+\text{offset3}+n_{shift}) \mod B; \text{ and}$$

$$f(x)=(r \cdot C+c+n_{shift}+\text{offset4}) \mod B, \text{ and } cR+r+\text{offset5}=x, \text{ where}$$

$g(z)=h(z) \mod B$, or $g(z)=h(z)$, and $x,z$, the offset1, the offset2, the offset3, the offset4, the offset5, and the offset6 are integers.

In an optional design, offset1=n, and $a_n \leq x < a_{n+1}$, where $n \in \{0, 1, \ldots N_{null}-1\}$, and $$a_n = \begin{cases} 0, n=0 \\ R \cdot (C-N_{null})+n(R-1), n \neq 0 \end{cases}.$$

Further, optionally, $N_{null}$ is not 0, and is less than C.

In an optional design, offert1=$n \cdot W_n$, $f(x)=g(x+n \cdot W_n)$, and a value of n meets $b_n \leq x < b_{n+1}$, and $n \in \{0, 1, \ldots, C-1\}$, where $$W_n = \begin{cases} \lfloor N_{null}/C \rfloor, n \in \{0, 1, \ldots, Q-1\} \\ \lceil N_{null}/C \rceil, n \in \{Q, Q+1, \ldots, C-1\} \end{cases},$$

$Q = C \cdot \lceil N_{null}/C \rceil - N_{null}$, and $$b_n = \begin{cases} 0, n=0 \\ nR - \sum_{s=1}^{n} W_s, n \neq 0 \end{cases}.$$

It should be noted that n in the optional design has a different meaning from n in the previous optional design. Further, optionally, $N_{null}$ is not 0, and is greater than C.

In an optional design, a value of the offset2 meets offset2=$N_{null}$, where $N_{null}$ meets $N_{null}=((\lceil B/R \rceil \cdot R)-B)$.

In an optional design, offset2=$\max\{0, r-(R-N_{null})\}$, or offset2=$\max\{0, (x \mod R)-(R-N_{null})\}$.

In an optional design, $$\text{offset 2} = \begin{cases} \min\{r, N_{null}\}, c \neq C-1 \\ \min\{r+N_{null}, N_{null}\} - C \cdot N_{null}, c = C-1 \end{cases}.$$

In an optional design, offset3=$\min\{0, (R-N_{null}-r)\}$, or offset3=$\min\{0, (R-N)-(x \mod R)\}$.

In an optional design, $$\text{offset 3} = \begin{cases} \max\{-r, -N_{null}\}, c \neq C-1 \\ C \cdot N_{null} + \max\{-(r+N_{null}), -N_{null}\}, c = C-1 \end{cases}.$$

In an optional design, a value of h(x) meets $h(x)=u(x)+n_{shift}$, and a value of u(x) is equal to (r·C+c), where x=cR+r, a value of $n_{shift}$ is $A·n_{id}·(N_{symbol}/L)$, A is an offset parameter obtained by the processing unit or the terminal device, $n_{id}$ is identification information obtained by the processing unit or the terminal device, and $N_{symbol}$ is a quantity of symbols occupied by the control resource set in time domain.

In an optional design, a value of h(x) meets h(x)=u(k), where a value of u(k) is equal to (r·C+c), a value of k meets $k=(x+n_{shift})\mod(B)$ $k=(x-n_{shift})\mod(B)$, $x=(k+n_{shift})\mod(B)$, or $x=(k-n_{shift})\mod(B)$, and values of c and r meet k=cR+r, or k=cR+r+offset6, where $n_{shift}$ is a shift value.

In an optional design, an $(m+1)^{th}$ location $e_{null}(m)$ in $N_{null}$ locations meets the following formula:

$$e_{null}(m) = R - \left\lfloor \frac{(N_{null} - m)·R}{N_{null}} \right\rfloor - 1,$$

where m∈{1, 2, ... $N_{null}$}; or $$e_{null}(m) = \left\lfloor \frac{m·R}{N_{null}} \right\rfloor,$$

where m∈{0, 1, 2, ... $N_{null}$−1}.

Optionally, a value of the offset4 is −m, $e_{null}(m) \le r < e_{null}(m+1)$.

Further, optionally, a value of the offset5 is $$\begin{cases} -\left\lfloor \frac{c}{C-1} \right\rfloor m, \text{otherwise} \\ -2·\left\lfloor \frac{c}{C-1} \right\rfloor m, N_{null} = 4 \end{cases}, e_{null}(m) \le r < e_{null}(m+1).$$

Further, optionally, a value of the offset4 meets offset4=−$N_{null}$, where $N_{null}$ meets $N_{null}=((\lceil B/R \rceil·R)-B)$.

Further, optionally, when c∈{0, 1, 2, ..., −1}, a value of the offset5 meets offset5=(−c−1), where r∈{1, ..., (R−1)}; and/or when c∈{$N_{null}$, $N_{null}$+1, ..., C−1}, a value of the offset5 meets offset5=−$N_{null}$, where r∈{0, 1, ..., (R−1)}.

In an optional design, when c∈{0, 1, 2, ..., $N_{null}$−1}, a value of the offset6 meets offset6=(−c−1), where r∈{1, 2, ..., R−1}; and/or when c∈{$N_{null}$, $N_{null}$+1, ..., C−1}, a value of the offset6 meets offset6=−$N_{null}$, where In an optional design, that the processing unit determines M resource element group bundles in a control resource set includes: the processing unit further determines the M resource element group bundles based on the at least one shift value. The at least one shift value includes the foregoing $n_{shift}$. A value of $n_{shift}$ may be determined by using at least one parameter, and the parameter may be at least one of an offset parameter A, an offset parameter Z, and identification information.

Optionally, the value of $n_{shift}$ may be determined by using the offset parameter A or Z, and the offset parameters A and Z are determined by using a parameter P. Further, optionally, a value of A is equal to a value of P, a value of Z is ($N_{symbol}/L$)·A, and $N_{symbol}$ is a quantity of OFDM symbols occupied by the control resource set in time domain.

Optionally, the value of $n_{shift}$ may be determined by using the identification information $n_{id}$. The identification information may be a cell identifier $N_{ID}^{cell}$, or a parameter configured by using higher layer signaling.

Optionally, the value of $n_{shift}$ may be determined by using the offset parameter A and the identification information $n_{id}$, or may be determined by using the offset parameter Z and the identification information $n_{id}$.

For example, the value of $n_{shift}$ meets $n_{shift}=A·(N_{symbol}/L)·\lfloor n_{id}/(A·(N_{symbol}/L)) \rfloor$, $n_{shift}=A·(N_{symbol}/L)·\lceil n_{id}/(A·(N_{symbol}/L)) \rceil$, or $n_{shift} \mod(A)=0$.

For another example, the value of $n_{shift}$ meets $n_{shift}=A·(N_{symbol}/L)·\lfloor n_{id}/(A·(N_{symbol}/L)) \rfloor+N_{null}$, or $n_{shift}=A·(N_{symbol}/L)·\lceil n_{id}/(A·(N_{symbol}/L)) \rceil-N_{Null}$.

For another example, the value of $n_{shift}$ meets $n_{shift}=Z·\lfloor n_{id}/Z \rfloor$, $n_{shift}=Z·\lceil n_{id}/Z \rceil$, or $n_{shift} \mod(Z)=0$.

For another example, the value of $n_{shift}$ meets $n_{shift}=A·(N_{symbol}/L)·n_{id}$, or $n_{shift}=Z·n_{id}$.

In an optional design, the processing unit determines that an index of an $(i+1)^{th}$ REG bundle in a $(j+1)^{th}$ control channel element CCE of the control resource set is f(x), where a value of x is equal to (6j/L+i), a value of f(x) meets $f(x)=(rC+c+n_{shift})\mod(C·R)$, or $f(x)=(rC+c+n_{shift})\mod B$, x∈{, 1, 2, 3, ..., C·R−1}, and a value set of f(x) is B numbers that are different from each other and that are less than B.

In the wireless apparatus, alternatively, the processing unit may be a processor, the receiving unit may be a receiver, and the transmitting unit may be a transmitter.

According to a second aspect, an embodiment of this application provides a communication method, where the method includes: determining, by a network device, M resource element group bundles in a control resource set; and sending, by the network device, a control channel on resources corresponding to the M resource element group bundles, where M is greater than or equal to 1.

In the communication method, methods used by the network device and a terminal device to determine the M resource element group bundles may be the same or different, but determining results are the same. For details, refer to a description of determining the M resource element group bundles in the communication method according to the first aspect.

According to the second aspect, an embodiment of this application further provides a wireless apparatus, where the wireless apparatus includes a processing unit and a transmitting unit. The processing unit determines M resource element group bundles in a control resource set; and the transmitting unit sends a control channel on resources corresponding to the M resource element group bundles, where M is greater than or equal to 1. Optionally, the wireless apparatus further includes a receiving unit.

In the wireless apparatus, a method used by the processing unit to determine the M resource element group bundles may be the same as or different from the determining method used by the wireless apparatus provided in the first aspect, and determining results are the same. For details, refer to a description of determining the M resource element group bundles in the communication method according to the first aspect.

In the wireless apparatus, alternatively, the processing unit may be a processor, the receiving unit may be a receiver, and the transmitting unit may be a transmitter.

According to a third aspect, an embodiment of this application provides an apparatus, including at least one memory and/or at least one processor, where the at least one processor executes a computer program to implement any method provided in the first aspect and/or the second aspect. Optionally, the apparatus is a chip or a wireless apparatus.

In an optional design, the computer program may be all stored in the at least one memory, or a part of the computer program is stored in the at least one memory, and the other part is stored in another storage medium different from the at least one memory.

In an optional design, the at least one processor is coupled to the at least one memory.

In an optional design, the at least one processor and the at least one memory are integrated into one chip.

According to a fourth aspect, an embodiment provides a system, including at least two apparatuses provided in the first aspect and the second aspect.

According to a fifth aspect, an embodiment provides a wireless apparatus, including one or more processors and a memory, where the memory stores a computer program, and when the processor executes the computer program, the apparatus is enabled to implement any method according to the first aspect and/or the third aspect.

According to a sixth aspect, an embodiment provides a computer storage medium storing a computer program, where the computer program is stored in the computer storage medium, and when the computer program is executed by a processor (or a device (a terminal device or a network device), any method according to the first aspect and/or the third aspect is implemented.

According to a seventh aspect, an embodiment provides a computer program product including an instruction, and when the computer program product is run on a computer, the computer is enabled to perform any method according to the first aspect and/or the third aspect.

According to an eighth aspect, an embodiment provides a chip system, where the chip system includes a processor, configured to support a network device or an apparatus in implementing a function in the first aspect and/or the third aspect, for example, generating or processing data and/or information in the foregoing method. In a possible design, the chip system further includes a memory, where the memory is configured to store a program instruction and data that are necessary for the network device or a communications apparatus. The chip system may include a chip, or may include a chip and another discrete device.

According to a ninth aspect, an embodiment provides a chip, where the chip includes a processing module and a communications interface, the processing module is configured to control the communications interface to communicate with the outside, and the processing module is further configured to implement any method provided in the first aspect and/or the third aspect.

Compared with the prior art, in the solutions provided in embodiments of the present invention, non-repeated mapping of a control channel element to a resource element group bundle can be implemented, thereby providing accuracy and efficiency of resource configuration.

BRIEF DESCRIPTION OF DRAWINGS

The following describes in more details embodiments of the present invention with reference to the accompanying drawings.

DESCRIPTION OF EMBODIMENTS

A network architecture and a service scenario described in embodiments of the present invention are intended to describe the technical solutions in the embodiments of the present invention more clearly, and do not constitute a limitation on the technical solutions provided in the embodiments of the present invention. A person of ordinary skill in the art may know that with the evolution of the network architecture and the emergence of new service scenarios, the technical solutions provided in the embodiments of the present invention are also applicable to similar technical problems.

In the embodiments of the present invention, "a plurality of" refers to two or more than two. The term "and/or" describes an association relationship for describing associated objects and represents that three relationships may exist. For example, A and/or B may represent the following three cases: only A exists, both A and B exist, and only B exists. The character "/" generally indicates an "or" relationship between the associated objects.

Figure 1:
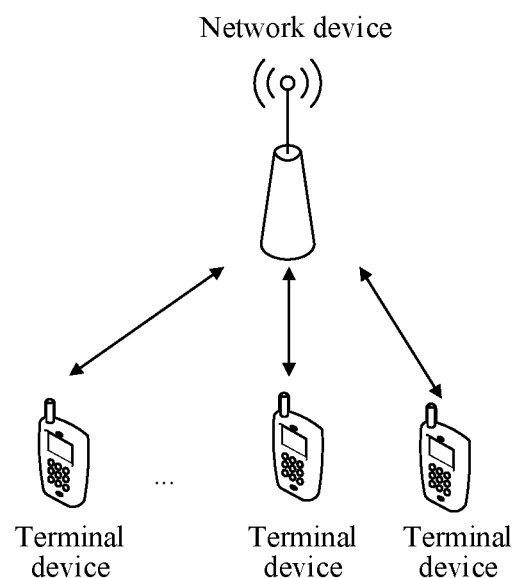
FIG. 1 is a schematic diagram of a possible application scenario according to an embodiment of the present invention.

FIG. 1 is a schematic diagram of a possible application scenario according to the embodiments of the present invention. A communications system in the application scenario includes a network device and one or more terminal devices. The network device may communicate with the terminal device by using one or more air interface technologies.

The following describes terms that may appear in the embodiments of the present invention.

A communications system may be applied to an LTE (long term evolution) system, or other wireless communications systems using various radio access technologies, for example, systems using access technologies such as code division multiple access, frequency division multiple access, time division multiple access, orthogonal frequency division multiple access, and single carrier frequency division multiple access. In addition, the communications system may be alternatively applied to a subsequent evolved system of the LTE system, for example, a 5th generation 5G system.

A network device may be a base station, an access point, or a network device, or may be a device in communication with a wireless terminal through one or more sectors on an air interface in an access network. The network device may be configured to mutually convert a received over-the-air frame and an IP packet and serve as a router between the wireless terminal and a rest portion of the access network, and the rest portion of the access network may include an internet protocol (IP) network. The network device may further coordinate attribute management of the air interface. For example, the network device may be a base transceiver station (BTS) in a global system for mobile communications (GSM) or code division multiple access (CDMA), or may be aNodeB (NB) in wideband code division multiple access (WCDMA), or may be an evolved NodeB (Evolutional Node B, eNB or eNodeB), a relay station, or an access point in long term evolution (LTE), or may be a base station in a future 5G network, for example, a gNB. This is not limited herein. It should be noted that, in a 5G or NR system, there may be one or more transmission reception points (TRP) in an NR base station. All TRPs belong to a same cell, and each TRP and each terminal may use the measurement reporting method described in the embodiments of the present invention. In another scenario, the network device may be further classified into a control unit (CU) and a data unit (DU). For a CU, there may be a plurality of DUs, and each DU and each terminal may use the measurement reporting method described in the embodiments of the present invention. A difference between a CU-DU separation scenario and a multi-TRP scenario lies in that a TRP is merely a radio frequency unit or an antenna device, but a protocol stack function can be implemented in the DU. For example, a physical layer function can be implemented in the DU.

A terminal device may be a wireless terminal or a wired terminal. The wireless terminal may be a device that provides a user with voice and/or other service data connectivity, a handheld device with a wireless connection function, or another processing device connected to a wireless modem. The wireless terminal may communicate with one or more core networks through a radio access network (RAN). The wireless terminal may be a mobile terminal, such as a mobile phone (or referred to as a "cellular" phone) or a computer with a mobile terminal, for example, may be a portable, pocket-sized, handheld, computer built-in, or vehicle-mounted mobile apparatus, which exchanges a language and/or data with the radio access network. For example, the wireless terminal may be a device such as a personal communications service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station (Subscriber Station), a mobile station a remote station (, a remote terminal, an access terminal, a user terminal, a user agent, a user device (or User Equipment). This is not limited herein.

A symbol includes but is not limited to an orthogonal frequency division multiplexing (OFDM) symbol, a sparse code division multiple access technology (SCMA) symbol, a filtered orthogonal frequency division multiplexing (F-OFDM) symbol, and a non-orthogonal multiple access (NOMA) symbol, and may be determined based on an actual situation, and details are not described herein.

A control resource set (CORESET) is a resource set used to control channel transmission. Time domain resources in the CORESET may be consecutive or inconsecutive.

A resource block (RB) or a physical resource block is a frequency domain resource unit, and occupies M consecutive subcarriers in frequency domain, where M is a natural number greater than 0. For example, in LTE, one RB occupies 12 consecutive subcarriers in frequency domain.

A resource element group (REG) is a time-frequency resource unit. For example, one REG occupies one resource block in frequency domain, and occupies one OFDM symbol in time domain.

A resource element group bundle (REG Bundle) includes a plurality of REGs that are consecutive in time domain or frequency domain, and the same precoding is used for the plurality of REGs. For example, one REG Bundle may include 2, 3, 6, or another quantity of REGs. In this way, resources, included in one REG bundle, of reference signals that are used to demodulate a control channel are more than resources, included in a single REG, for reference signals, so that accuracy of channel estimation is improved, and a bit error rate of control channel transmission is reduced.

Higher layer signaling is different from physical layer signaling, and may be master information block (MIB) signaling, system information block (SIB) signaling, radio resource control (RRC) signaling, or other higher layer signaling that has a similar feature.

A bandwidth part BandWidth Part (BWP) includes a plurality of consecutive physical resource blocks in frequency domain, and is usually configured by a network device for a terminal device. The terminal device receives or sends data on the BWP. Control resource transmission is used as an example, one BWP includes at least one control resource set, and frequency domain resources included in the control resource set do not exceed a plurality of physical resource blocks included in the BWP in frequency domain.

Figure 2:
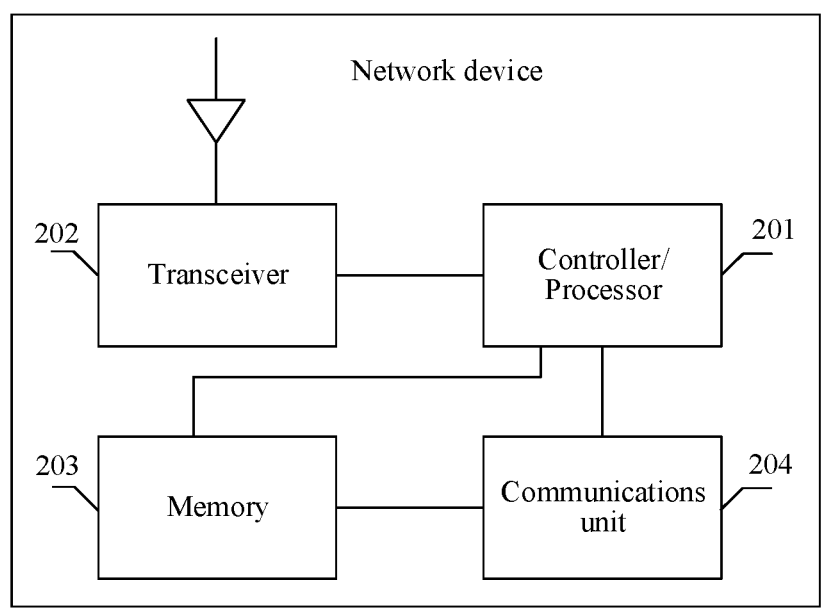
FIG. 2 is a possible schematic structural diagram of a network device according to an embodiment of the present invention.

Further, a possible schematic structural diagram of the network device may be shown in FIG. 2. The network device 102 can perform a method provided in an embodiment of the present invention. The network device 102 may include a controller or processor 201 (the following uses the processor 201 as an example for description) and a transceiver 202. The controller/processor 201 is sometimes also referred to as a modem processor. The modem processor 201 may include a baseband processor (BBP) (not shown). The baseband processor processes a received digitized signal, to extract an information or data bit included in the signal. In this way, based on a requirement or an expectation, the BBP is usually implemented in one or more digital signal processors (DSP) in the modem processor 201 or implemented as a separated integrated circuit (IC).

The transceiver 202 may be configured to: support sending and receiving information between the network device and a terminal device, and support radio communication between terminal devices. The processor 201 may be further configured to perform various functions for communication between the terminal device and another network device. On an uplink, an uplink signal from the terminal device is received by using an antenna, demodulated by the transceiver 202, and further processed by the processor 201, to recover service data and/or signaling information sent by the terminal device. On a downlink, service data and/or a signaling message are/is processed by the terminal device and modulated by the transceiver 202 to generate a downlink signal, and the downlink signal is transmitted to the terminal device by using an antenna. The network device may further include a memory 203, and the memory 203 may be configured to store program code and/or data of the network device. The transceiver 202 may include an independent receiver circuit and an independent transmitter circuit, or may include a circuit implementing receiving and sending functions. The network device may further include a communications unit 204, configured to support communication between the network device and another network entity. For example, the communications unit 204 is configured to support communication between the network device and a network device of a core network, or the like.

Optionally, the network device may further include a bus. The transceiver 202, the memory 203, and the communications unit 204 may be connected to the processor 201 by using the bus. For example, the bus may be a peripheral component interconnect (PCI) bus, an extended industry standard architecture (EISA) bus, or the like. The bus may include an address bus, a data bus, a control bus, and the like.

Figure 3:
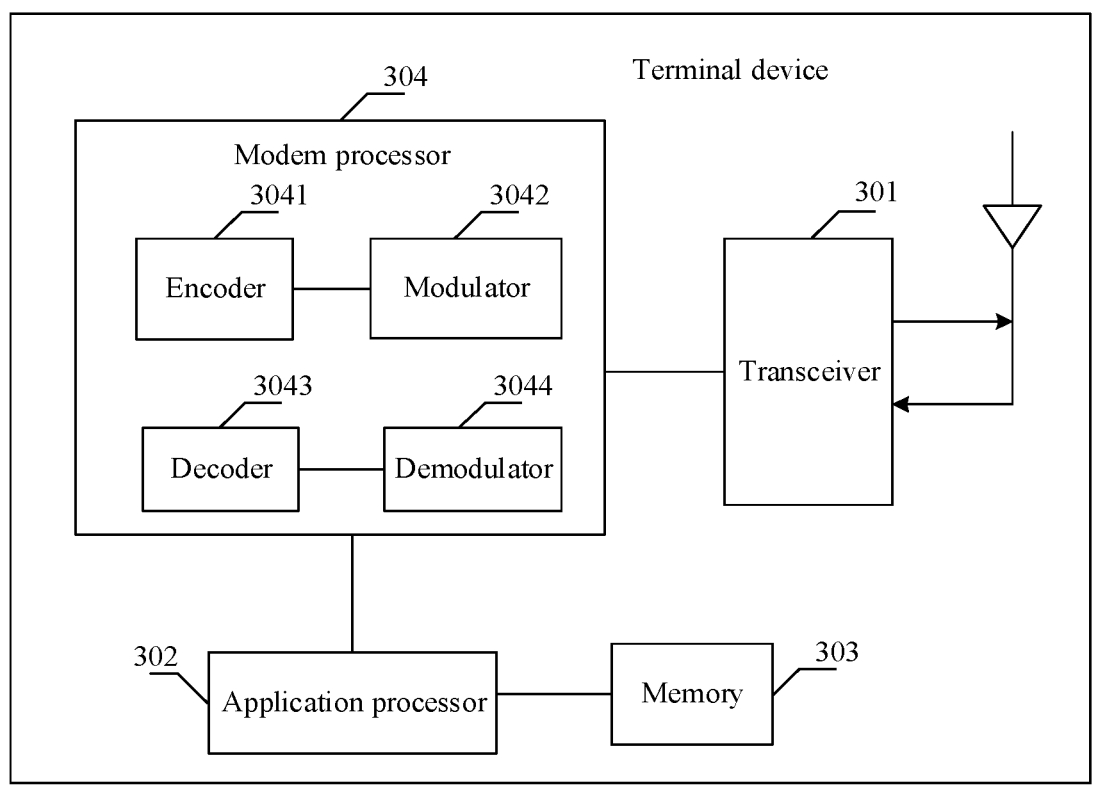
FIG. 3 is a possible schematic structural diagram of a terminal device according to an embodiment of the present invention.

FIG. 3 is a possible schematic structural diagram of the terminal device in the foregoing communications system. The terminal device can perform a method provided in an embodiment of the present invention. The terminal device may be any one of one or more terminal devices in FIG. 1. The terminal device includes a transceiver 301, an application processor 302, a memory 303, and a modem processor 304.

The transceiver 301 may adjust (for example, perform analog-conversion, filtering, amplification, and up-conversion) the output sampling and generates an uplink signal. The uplink signal is transmitted to the base station in the foregoing embodiment by using an antenna. On a downlink, the antenna receives a downlink signal transmitted by a network device. The transceiver 301 may adjust (for example, perform filtering, amplification, down-conversion, and digitization) the signal received by using the antenna and provide input sampling.

The modem processor 304 is sometimes also referred to as a controller or a processor, and may include a baseband processor (BBP) (not shown). The baseband processor processes a received digitalized signal, to extract information or a data bit included in the signal. Based on a requirement or an expectation, the BBP is usually implemented in one or more digits in the modem processor 304 or implemented as a separated integrated circuit (IC).

In a design, the modem processor (modem processor) 304 may include an encoder 3041, a modulator 3042, a decoder 3043, and a demodulator 3044. The encoder 3041 is configured to encode a to-be-sent signal. For example, the encoder 3041 may be configured to: receive service data and/or a signaling message that are/is to be sent on an uplink, and process (for example, formats, encodes, and interleaves) the service data and the signaling message. The modulator 3042 is configured to modulate an output signal of the encoder 3041. For example, the modulator may perform processing such as symbol mapping and/or modulation on the output signal (data and/or signaling) of the encoder, and provide output sampling. The demodulator 3044 is configured to demodulate an input signal. For example, the demodulator 3044 processes input sampling and provides symbol estimation. The decoder 3043 is configured to decode an input signal obtained after demodulation. For example, the decoder 3043 performs processing such as de-interleaving and/or decoding on the input signal after the demodulation, and outputs a signal (data and/or signaling) obtained after decoding. The encoder 3041, the modulator 3042, the demodulator 3044, and the decoder 3043 may be implemented by using the integrated modem processor 304. The units perform processing based on a radio access technology used in a radio access network.

The modem processor 304 receives, from the application processor 302, digitalized data that may represent voice, data, or control information, and processes the digitalized data for transmission. The modem processor may support one or more of a plurality of wireless communications protocols used in a plurality of communications systems, for example, LTE, new radio, a universal mobile telecommunications system (UMTS), and high speed packet access (HSPA). Optionally, the modem processor 304 may also include one or more memories.

Optionally, the modem processor 304 and the application processor 302 may be integrated into one processor chip.

The memory 303 is configured to store program code (sometimes referred to as a program, an instruction, software, or the like) and/or data that are/is used to support the terminal device in performing communication.

It should be noted that the memory 203 or the memory 303 may include one or more storage units, for example, the storage unit may be a storage unit that is configured to store program code and that is inside the processor 201 or the modem processor 304 or the application processor 302, or an external storage unit independent of the processor 201 or the modem processor 304 or the application processor 302, or a component that includes a storage unit inside the processor 201 or the modem processor 304 or the application processor 302 and an external storage unit independent of the processor 201 or the modem processor 304 or the application processor 302.

The processor 201 and the modem processor 304 (the processor 304 for short below) may be processors of a same type or processors of different types. For example, each of the processor 201 and the modem processor 304 may be implemented as a central processing unit (CPU), a general purpose processor, a digital signal processor (DSP), an application-specific integrated circuit (ASIC), a field programmable gate array (FPGA) or another programmable logic device, a transistor logic device, a hardware component, another integrated circuit, or any combination thereof. The processor 201 and the modem processor 304 may implement or perform various examples of logical blocks, modules, and circuits described with reference to content disclosed in the embodiments of the present invention. Alternatively, the processor may be a combination of devices that implement a calculation function, for example, the combination may be a combination of one or more microprocessors, a combination of a DSP and a microprocessor, or a system-on-a-chip (SOC).

A person skilled in the art can understand that various explanatory logic blocks, modules, circuits, and algorithms described with reference to the various aspects disclosed in this application may be implemented as electronic hardware, an instruction that is stored in a memory or another computer-readable medium and that is executed by a processor or another processing device, or a combination thereof. For example, the devices described in this specification may be applied to any circuit, hardware component, IC, or IC chip. The memory disclosed in this application may be any type of memory in any size, and may be configured to store any type of required information. To clearly explain such interchangeability, various explanatory components, blocks, modules, circuits, and steps have been generally described above based on functionality. How to implement such functionality depends on specific application, a design selection, and/or a design constraint that is imposed on an entire system. A person skilled in the art may use different manners to implement the described functionality for different particular applications, but it should not be considered that such implementation decision goes beyond the scope of the present invention.

In the embodiments of the present invention, sending a downlink (uplink) channel may refer to sending data or information carried on the downlink (uplink) channel. The data or information may be data or information obtained after channel coding.

The following further describes the embodiments of the present invention in detail based on a common aspect of the present invention described above. In descriptions about the embodiments, uplink and downlink latencies that may exist are ignored, and it is assumed that a time of transmission by the network device is the same as a time of reception by the terminal device. For processing corresponding to sending of the network device and receiving of the terminal device, the embodiments are described mainly from a perspective of a terminal device side. A person skilled in the art may understand that, the receiving of the terminal device from the network device means that the network device performs sending. For an expression of a "resource block unit" in the present invention, a person skilled in the art may understand that, the resource block unit means logical division of a resource block for ease of resource configuration based on a corresponding resource allocation granularity, and another expression used for resource block division may be covered.

In addition, numbers of steps in the embodiments of the present invention do not limit a sequence of a specific execution process. An execution sequence of the steps is adaptively adjusted in different optional designs. Values of parameters represented by using letters in the embodiments of the present invention are all non-negative integers. In other words, the values indicated by the letters are all non-negative integers. In operators that may be in the embodiments of the present invention, "<" or "＜" indicates "less than", ">" or"＞" indicates "greater than", "≤" indicates "less than or equal to", "≥" indicates "greater than or equal to", "≠" indicates "not equal to", "·" indicates "multiplying", "⌊ ⌋" indicates "rounding down", and "⌈ ⌉" indicates "rounding up".

The following uses a 5G communications system as an example to describe a configuration status of a downlink transmission resource. In an NR standard of the 5G communications system, the downlink transmission resource occupies all or a part of a system bandwidth in frequency domain, and includes several OFDM symbols in time domain. A control channel may include one or more CCEs. One CCE includes a plurality of REGs. For example, each CCE includes six REGs. Therefore, when sending the control channel, the network device needs to map, on one or more control resource sets allocated to each terminal device, the one or more CCEs forming the control channel to REGs in a control channel resource set. The REGs are physical resources, and the CCEs are logical units forming the control channel. CCE-to-REG mapping is mapping each CCE used by the control channel to a physical resource.

Currently, in the NR standard, the REGs included in the control resource set are numbered in a time-domain-first manner. To be specific, the REGs are numbered starting from a first OFDM symbol and a location of a minimum resource block number that are included in the control resource set. Optionally, the numbering manner may also be determined based on configuration information of the control resource set. To be specific, numbering is performed in a frequency-first manner or in the time-domain-first manner.

The NR standard supports the following CCE-to-REG resource mapping manners: a non-interleaved (non-Interleaved) resource mapping manner and an interleaved (Interleaved) resource mapping manner. When the CCE-to-REG resource mapping is performed in non-Interleaved, REGs belonging to a same CCE are consecutively mapped on a time domain resource and/or a frequency domain resource. When the CCE-to-REG resource mapping is performed in Interleaved, REGs belonging to a same CCE are discretely mapped in time domain and/or frequency domain and a granularity of discreteness is a size of an REG bundle. The REG bundle includes a plurality of REGs which are consecutive or adjacent in time domain and/or frequency domain, and the size of the REG bundle is related to a configuration of the control resource set. For example, when the CCE-to-REG mapping in the control resource set is performed in the interleaved resource mapping manner, and the control resource set includes one or two OFDM symbols in time domain, the size of the REG bundle may be 2 or 6. When the CCE-to-REG mapping in the control resource set is performed in the interleaved resource mapping manner, and the control resource set includes three OFDM symbols in time domain, the size of the REG bundle may be 3 or 6. When the CCE-to-REG mapping in the control resource set is performed in the non-interleaved resource mapping manner, the size of the REG bundle may be 6.

When the size of the REG bundle is given, REGs included in the REG bundle may be formed in the time-domain-first manner, or may be formed in a frequency-domain-first manner. For example, when the size of the REG bundle is 2, if the time-domain-first manner is used, the REGs forming the REG bundle include two REGs that are consecutive in time domain; or if the frequency-domain-first manner is used, the REGs forming the REG bundle include two REGs that are consecutive in frequency domain. Optionally, whether the REG bundle is formed in the time-domain-first manner or the frequency-domain-first manner may be determined based on a configuration of the control channel resource set, or may be determined based on a quantity of OFDM symbols of the control resource set in time domain. For example, when the control resource set includes two or three OFDM symbols, the REG bundle is formed in the time-domain-first manner; or when the control resource set includes one OFDM symbol, the REG bundle is formed in the frequency-domain-first manner.

In the interleaved manner, a logical number of an REG bundle included in one CCE corresponds to at least one physical number of an REG bundle different from a logical number. For example, in the non-interleaved manner, a number of a physical REG bundle corresponding to a $j^{th}$ CCE is $\{6j/L, 6j/L+1, \ldots, 6j/L+L-1\}$, where L is a quantity of REGs included in the REG bundle. A number of an REG corresponding to a number of an $i^{th}$ REG bundle is $\{i, iL+1, \ldots, iL+L-1\}$, where a value of L may be $\{2, 3, 6\}$. In addition, in the interleaved manner, a number of a physical REG bundle corresponding to a $j^{th}$ CCE is $\{f(6j/L), f(6j/L+1), \ldots, f(6j/L+L-1)\}$, where f( ) may be represented as an interleaver, and is given by the following formulas:

$$f(x)=(rC+c+n_{shift}) \bmod (N_{REG}^{CORESET}/L)$$

$$x=cR+r$$

$$r=0,1,\ldots,R-1$$

$$c=0,1\ldots,C-1$$

$$C=\lceil N_{REG}^{CORESET}/(LR) \rceil, \text{ where}$$

R□$\{2, 3, 6\}$, $N_{REG}^{CORESE}$ is a quantity of REGs included in the control resource set, and one or more of L, R, and $n_{shift}$ may be determined based on configuration information of higher layer signaling.

In the foregoing technology, the interleaver function f(.) is not applicable to all possible configuration cases. In particular, when $N_{REG}^{CORESE}$ cannot be exactly divided by a product of L and R, as shown in the control resource set in FIG. 4, an output value of the interleaver function may be repeated many times.

The control resource set includes 24 resource blocks consecutive in frequency domain and two OFDM symbols consecutive in time domain, and a quantity of REGs included in the control resource set is 2×24=48, that is, $N_{REG}^{CORESE}$=48. When one CCE includes six REGs, the CORESET includes eight CCEs in total, and the CCEs are numbered {0, 1, 2, 3, 4, 5, 6, 7}. If $n_{shift}$=0, L=6, and R=6 are determined through configuration of the higher layer signaling, in the CORESET, an REG bundle corresponding to a CCE 0 is {f(0)}, an REG bundle corresponding to a CCE 1 is {f(1)}, an REG bundle corresponding to a CCE 2 is {f(2)}, an REG bundle corresponding to a CCE 3 is {f(3)}, an REG bundle corresponding to a CCE 4 is {f(4)}, an REG bundle corresponding to a CCE 5 is {f(5)}, an REG bundle corresponding to a CCE 6 is {f(6)}, and an REG bundle corresponding to a CCE 7 is {f(7)}. An expression of f( ) is shown in a formula (1).

If f(x=1) and R=6, c=0 and r=1 (x=cR+r). Further, C=|$N_{REG}^{CORESET}$/(LR)|=2, and (C·R)=12, which is greater than the quantity 8 of REG bundles in the CORESET.

By analogy, the following is obtained:

$$f(x=0)=(rC+c)\mod(N_{REG}^{CORESE}/L)=(0\times2+0)\mod(48/6)=0;$$

$$f(x=1)=(rC+c)\mod(N_{REG}^{CORESE}/L)=(1\times2+0)\mod(48/6)=2;$$

$$f(x=2)=(rC+c)\mod(N_{REG}^{CORESE}/L)=(2\times2+0)\mod(48/6)=4;$$

$$f(x=3)=(rC+c)\mod(N_{REG}^{CORESE}/L)=(3\times2+0)\mod(48/6)=6;$$

$$f(x=4)=(rC+c)\mod(N_{REG}^{CORESE}/L)=(4\times2+0)\mod(48/6)=0;$$

$$f(x=5)=(rC+c)\mod(N_{REG}^{CORESE}/L)=(5\times2+0)\mod(48/6)=2;$$

$$f(x=6)=(rC+c)\mod(N_{REG}^{CORESE}/L)=(0\times2+1)\mod(48/6)=1; \text{and}$$

$$f(x=7)=(rC+c)\mod(N_{REG}^{CORESE}/L)=(1\times2+1)\mod(48/6)=3.$$

It can be learned from the foregoing that values of f(x=0) and f(x=4) are the same, and values of f(x=1) and f(x=5) are the same. Because a value of an interleaving function is repeated, CCEs with different numbers are mapped to a same REG bundle, thereby causing a failure in sending and/or receiving control information.

An embodiment of the present invention provides a communication method. A network device determines M resource element group REG bundles in a control resource set, and sends a control channel to a terminal device; and the terminal device determines the M REG bundles, and detects the control channel on a resource corresponding to the M REG bundles. By using the communication method, accurate and efficient resource configuration in a communications system is implemented, and communication efficiency is improved.

It should be noted that similar expressions such as "first" and "second" in this embodiment of the present invention are merely used as examples, and do not constitute a limitation on a sequence or a number.

It should be noted that locations of the REG bundles or results output by f(x) that are determined in this embodiment of the present invention are locations, in the control resource set, of the M REG bundles constituting a CCE, and specific values may be numbers or indexes of the REG bundles. In a specific description process, a location, a number, and an index may be replaced with each other.

It should be noted that an "obtaining" operation in this embodiment of the present invention may be determining or receiving.

It should be further noted that this embodiment of the present invention relates to resource location mapping. Therefore, a large quantity of parameters, intermediate variables, and formulas are involved inevitably. However, a "determining" operation in this embodiment of the present invention is not limited to being determined based on the parameters, the intermediate variables, and the formulas in this embodiment, but is determined based on technical concepts embodied in the formulas. That is, the parameters, the intermediate variables, and the formulas in this embodiment of the present invention should not be limited only to the parameters, the variables, and the formulas. A scope of the solution should cover a scope determined based on technical meanings expressed by the specific parameters and intermediate variables, and calculation of the formulas is not limited only to the formulas. A person skilled in the art may make a proper variation on the basis of the formulas, but results implemented by the formulas may be obtained, or a concept and a solution for resolving a same or similar technical problem should also fall within a coverage scope of this embodiment of the present invention.

In addition, a person skilled in the art may understand that, when a value of M3 meets M3=M1 mod M2, if a value of M1 is less than a value of M2, the value of M3 meets M3=M1 mod M2, that is, it is equivalent that the value of M3 meets M3=M1.

Figure 5:
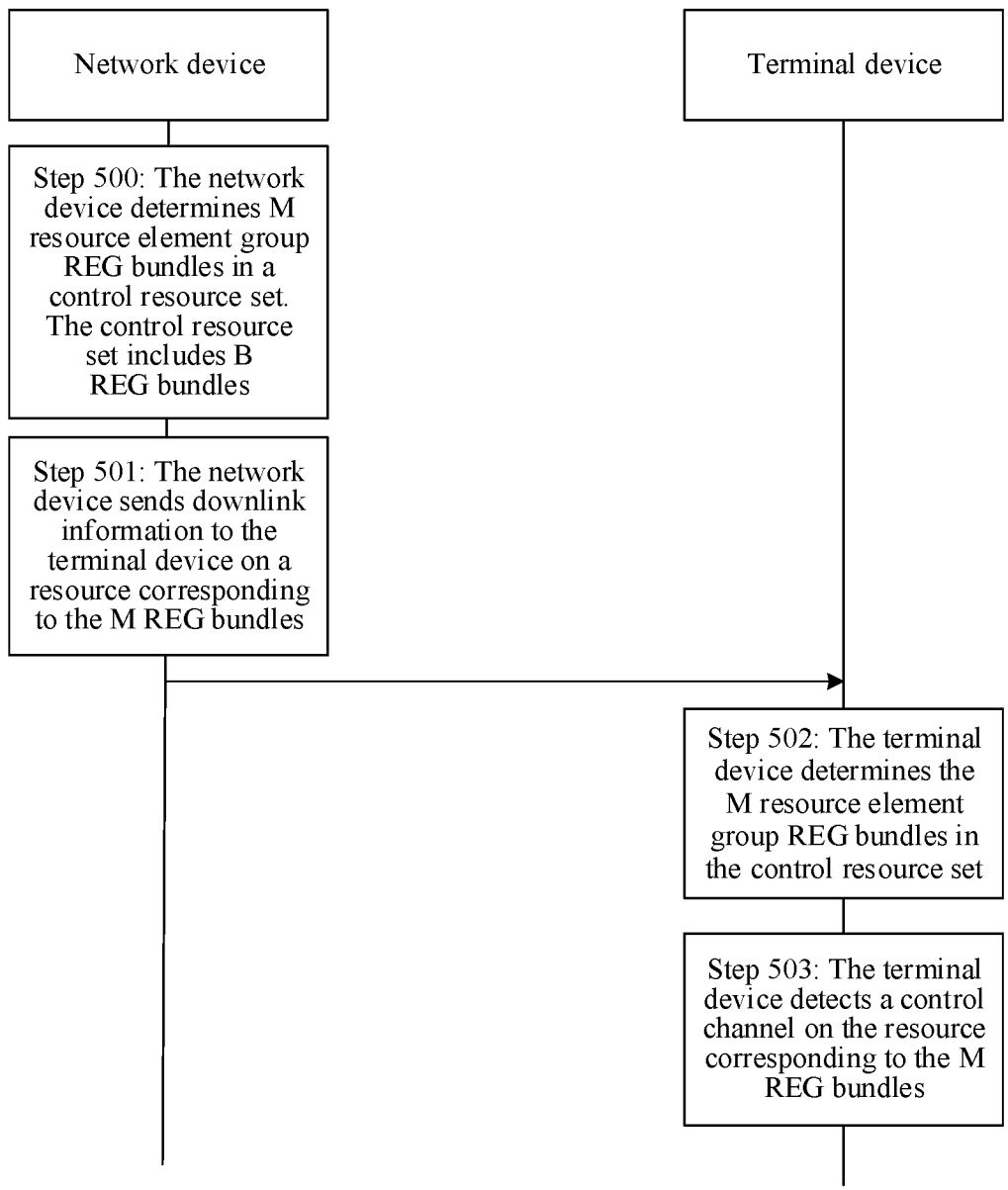
FIG. 5 is a schematic flowchart of a possible communication method according to an embodiment of the present invention.

FIG. 5 shows a specific implementation of the communication method in this embodiment of the present invention, and a solution provided in this embodiment of the present invention is described below with reference to FIG. 5.

For ease of description, in this embodiment of the present invention, interleaving processing of resource allocation is implemented in a manner of a matrix interleaver, and a size of the matrix interleaver is implemented by using row and column values of a matrix. Through processing of the matrix interleaver, one or more CCEs obtained by logically dividing the control resource set are mapped to corresponding physical resource REG bundles, to implement sending and receiving of downlink information.

Step 500: A network device determines M resource element group REG bundles in a control resource set, and the control resource set includes B REGs.

The determining step may be performed by a processor 201 of the network device.

Step 501: The network device sends downlink information to a terminal device on a resource corresponding to the M REG bundles, and the downlink information may be a control channel and/or a data channel, or the like.

This step may be performed by a transceiver 202 of the network device, or performed by the transceiver 202 under control of the processor 201 of the network device.

The control resource set includes N REGs, the N REGs are logically divided into one or more CCEs, and numbers of the one or more CCEs are arranged in order of sizes. A quantity of REGs included in each CCE is S, the M REGs bundles form a first control channel element CCE (corresponding to a $(j+1)^{th}$ CCE in order of numbers) in the control resource set, a number of the first CCE is j, and $j \in \{0, 1, \ldots, N/S-1\}$, where L is a size of an REG bundle, B is equal to N/L, and M is greater than or equal to 1.

Step 502: The terminal device determines the M resource element group REG bundles in the control resource set.

The determining step may be performed by a processor 304 of the terminal device.

Step 503: The terminal device detects a control channel on a resource corresponding to the M REG bundles.

Step 503 may be alternatively expressed as that the terminal device detects and receives the control channel on the resource corresponding to the M REG bundles, or may be expressed as that the terminal device receives the control channel on the resource corresponding to the M REG bundles.

The determining step may be performed by the processor 304 of the terminal device, or may be performed by a transceiver 301, or may be performed by the transceiver 301 under control of the processor 304.

By using the communication method implemented in the steps 500 to 503, accurate and efficient resource configuration in a communications system can be implemented, and communication efficiency is improved.

It should be noted that a determining operation of the network device in this embodiment of the present invention may be performed by the processor 201, and receiving and sending operations of the network device may be performed by the transceiver 202, or may be performed by the transceiver 202 under the control of the processor 201. A determining operation of the terminal device may be performed by the processor 304, and an obtaining operation of the terminal device may be performed by the processor 304 or the transceiver 301, or may be performed by the transceiver 301 under the control of the processor 304, and may be determined depending on an obtaining manner. Receiving and sending operations of the terminal device may be performed by the transceiver 301.

In this embodiment of the present invention, the network device configures the control resource set. The control resource set may be configured by using higher layer signaling, and the higher layer signaling includes broadcast information, system information (for example, during initial access, system information used to configure an initial access channel (Random access channel) is included), RRC signaling, and the like. The terminal device may obtain the control resource set based on configuration of the higher layer signaling. Optionally, a configuration of the control resource set includes but is not limited to a frequency domain resource location and a time domain length. The frequency domain resource location and the time domain length may be used to determine a quantity N of REGs included in the control resource set. The terminal device may obtain a value of N in another manner. This is not limited in this embodiment of the present invention.

Further, optionally, the network device configures a size L of an REG bundle in the control resource set, that is, a quantity of REGs included in one REG bundle. Optionally, a value range of L is $\{2, 3, 6\}$. The configuration may be completed by using the higher layer signaling.

Further, optionally, a quantity of REGs included in each CCE is S, and S may be preconfigured or predefined, for example, specified in a standard or a protocol, or may be configured by the network device. Optionally, a value of S is 6.

Figure 6:
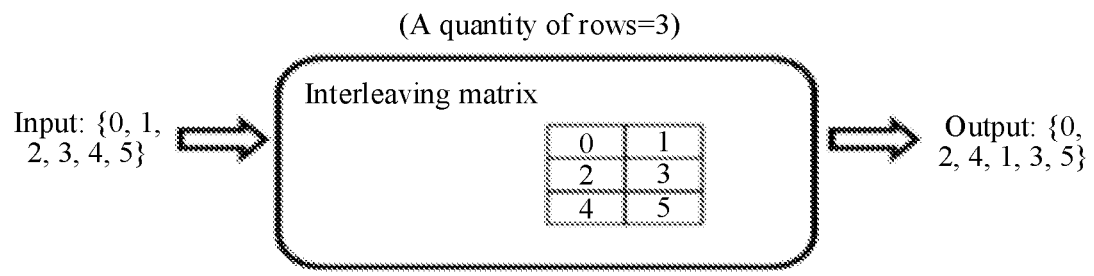
FIG. 6 is a schematic diagram of possible interleaved mapping according to an embodiment of the present invention.

It should be noted herein that, in an NR system, a rectangular interleaver is used to perform resource configuration or mapping, and a matrix is generated by using the rectangular interleaver. Row and column locations in the matrix are used for mapping taking an REG bundle as a granularity. Generally, referring FIG. 6, an input and an output of the matrix interleaver are performed in a manner of row-in and column-out. For example, numbers 0 to 5 are input into the interleaver in order of $\{0, 1, 2, 3, 4, 5\}$, undergoes matrix interleaving in row-first order, and output in column-first order. Numbers are output as $\{0, 2, 4, 1, 3, 5\}$. For ease of description, a quantity of rows of the matrix is referred to as R (Row), and a quantity of columns of the matrix is referred to as C (Column). Further, $r \in \{0, 1, \ldots, R-1\}$ (also referred to as a row number), and $c \in \{0, 1, \ldots, C-1\}$ (also referred to as a column number). Optionally, R is configured by the network device, and is also referred to as an interleaving parameter. For example, R is configured by using the higher layer signaling, and C may be configured by the network device, or may be implicitly indicated by configuration of the network device. A value of C is equal to $\lceil B/R \rceil$. It should be noted that meanings of L, N, C, R, and B in this embodiment of the present invention are the same. For details, refer to the foregoing descriptions.

In this embodiment of the present invention, when the rectangular interleaver is used for resource configuration or mapping, a size of the matrix is a $C \cdot R$, and a quantity of REG bundles included in the control resource set is B. When the size of the matrix is equal to B, complete mapping can be implemented, and no mapping location conflict occurs. When the size of the matrix is greater than B, to avoid a resource conflict because different CCEs are mapped to a same REG bundle, a mapping location of the REG bundle needs to be accurately and efficiently determined.

Common features in the following description are explained as follows:

f(x): used to indicate an index that is numbered x and that is of an REG bundle, or referred to as an interleaver or an interleaver function; and (x): used to indicate an index that is numbered x and that is of an REG bundle, different from f(x), g(x) may be an interleaver or an interleaver function in the prior art. For example, $g(x) = h(x) \mod B$, or $g(x) = h(x)$ (it should be noted herein that when a value of h(x) is less than B, $g(x) = h(x) \mod B = h(x)$).

Further, a value of g(x) may be:

$$g(x) = h(x) \mod B = (rC + c + n_{shift}) \mod (N/L)$$

x = cR+r
$r \in \{0, 1, \ldots, R-1\}$
$c \in \{0, 1, \ldots, C-1\}$. Herein, $h(x) = rc + c + n_{shift}$.

Optionally, when the value of h(x) is less than B, $g(x) = h(x) = (r \cdot C + c)$ To distinguish from the foregoing formula, $(r \cdot C + c)$ herein is defined as u(k), that is, $u(k) = (r \cdot C + c)$, where values of c and r meet $k = cR+r$ (or $k = cR+r+$offset6 and for a value of the offset6, refer to the following description); and a value of k meets $k = (x + n_{shift}) \mod(B)$, $k = (x - n_{shift}) \mod(B)$, $x = (k + n_{shift}) \mod(B)$, or $x = (k - n_{shift}) \mod(B)$.

A value of $n_{shift}$ is determined by the terminal device or the network device, for example, may be predefined or preconfigured, may be configured by the network device, may be determined by the terminal device based on the configuration of the network device, or may be determined based on a specific rule, and may be designed differently based on different scenarios. For example, the terminal device determines, by using a parameter configured by the higher layer signaling, the value of $n_{shift}$ based on a predetermined rule or function. Based on the foregoing formulas, the values of r and c may be determined based on z and R, thereby further obtaining a value of x). For a specific explanation of $n_{shift}$, refer to a description of a second optional design in the following.

In the foregoing steps 500 and 502, the network device and the terminal device separately determine the M resource element group REG bundles in the control resource set. The network device and the terminal device determine that an index of an $(i+1)^{th}$ REG bundle in a $(j+1)^{th}$ control channel element CCE of the control resource set is f(x), where a value of x is equal to (6j/L+i).

Figure 7:
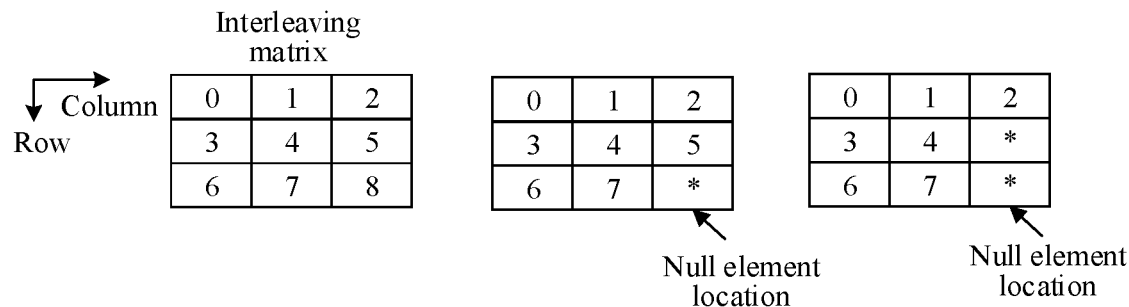
FIG. 7 is a schematic diagram of other possible interleaved mapping according to an embodiment of the present invention.

In a first optional design, the M REG bundles are determined based on at least one offset value. The at least one offset value may be determined based on a difference between the size of the matrix and B, that is, ((C·R)−B), and ((C·R)−B) is subsequently referred to as $N_{null}$, that is, a quantity of null elements (or referred to as locations at which numbers of the REG bundles are repeated). The null elements are locations that are ignored or not read by the terminal device, and the locations are not mapped to CCEs in the control channel element. Refer to FIG. 7. The numbers of the REG bundles in the control channel element are input into an interleaving matrix in a row-first manner, and are output from the interleaving matrix in a column-first manner. When the size of the matrix is greater than B, to avoid a resource mapping conflict, there are a plurality of configuration manners for mapping locations of the REG bundles and a quantity and locations of the null elements in the matrix. The at least one offset value includes one or more of an offset1, an offset2, an offset3, an offset4, an offset5, and an offset6. There are a plurality of optional implementations in the first optional design. The plurality of optional implementations are described separately in the following. Further, optionally, any one or more of the at least one offset value may be determined based on a value of $((\lceil B/R \rceil \cdot R)-B)$, and at least one of a row number r and a column number c. That is, the any one or more of the at least one offset value are determined based on the value of $((\lceil B/R \rceil \cdot R)-B)$ and the row number r, or the any one or more of the at least one offset value are determined based on the value of $((\lceil B/R \rceil \cdot R)-B)$ and the column number c, or the any one or more of the at least one offset value are determined based on the value of $((\lceil B/R \rceil \cdot R)-B)$, the row number r, and the column number c.

In a first optional implementation, the at least one offset value includes the offset1 In this optional implementation, the locations of the null elements (the locations at which the numbers of the REG bundles are repeated) are at an end of a last row in the matrix. For determining of indexes of the M REG bundles, the end of the last row needs to be avoided, that is, an output of the matrix cannot include $N_{null}$ locations at the end of the last row in the matrix. For details, refer to FIG. 7.

Optionally, a value of f(x) meets f(x)=g(x+offset1).
Optionally, a value of f(x) meets $f(x)=(rC+c+n_{shift})$ mod B where x=cR+r−offset1.

In the two optional manners, a value of the offset1 varies based on different $N_{null}$. For details, refer to the following description.

When $N_{null}=0$, f(x)=g(x).
When $N_{null} \neq 0$, reference is made to values in the following two cases.

In a first case, when $C \geq N_{null}$, offset1=n, f(x)=g(x+n) a value of n meets $a_n \leq x < a_{n+1}$, and $n \in \{0, 1, \ldots, N_{null}-1\}$, where $a_n\{_{R \cdot (C-N_{null})+n(R-1),\ n \neq 0}^{0,\ n=0}$, $N_{null}=(C \cdot R-B)$, and $C=\lceil B/R \rceil$.

In a second case, when $C<N_{null}$, offert1=n·$W_n$, and $f(x)=g(x+n·W_n)$ where n in this case has a different meaning from n in the first case. For details, refer to a corresponding explanation. A value of n meets $b_n \leq x < b_{n+1}$, and $n \in (0, 1, \ldots, C-1)$, where $$W_n = \begin{cases} \lfloor N_{null}/C \rfloor, n \in \{0, 1, \ldots, Q-1\} \\ \lceil N_{null}/C \rceil, n \in \{Q, Q+1, \ldots, C-1\} \end{cases},$$

$Q = C \cdot \lceil N_{null}/C \rceil$, and $$b_n = \begin{cases} 0, n = 0 \\ nR - \sum_{s=1}^{n} W_s, n \neq 0 \end{cases}.$$

Referring to an example 1, the control resource set includes 21 resource blocks consecutive in frequency domain and two OFDM symbols consecutive in time domain, and then a quantity of REGs included in the control resource set is 2×21=42, that is, N=42. The CCE includes six REGs. If the CORESET includes seven CCEs in total, the CCEs are numbered {0, 1, 2, 3, 4, 5, 6}. If $n_{shift}=0$, L=6, and R=3 are determined through the configuration of the higher layer signaling, in the CORESET, an REG bundle corresponding to a CCE 0 is {f(0)}, an REG bundle corresponding to a CCE 1 is {f(1)}, an REG bundle corresponding to a CCE 2 is {f(2)}, an REG bundle corresponding to a CCE 3 is {f(3)}, an REG bundle corresponding to a CCE 4 is {f(4)}, an REG bundle corresponding to a CCE 5 is {f(5)}, and an REG bundle corresponding to a CCE 6 is {f(6)}.

If g(x=1), and R=3, based on x=cR+r, it can be learned that c=0, and r=1. Further, if B=7, and C=3, based on $g(x)=(rC+c+n_{shift})$mod(N/L), it can be learned that $g(x=0)=(rC+c)$mod$(N/L)=(0 \times 3+0)$mod$(42/6)=0$;

$g(x=1)=(rC+c)$mod$(N/L)=(0 \times 3+0)$mod$(42/6)=3$;

$g(x=2)=(rC+c)$mod$(N/L)=(2 \times 3+0)$mod$(42/6)=6$;

$g(x=3)=(rC+c)$mod$(N/L)=(0 \times 3+1)$mod$(42/6)=1$;

$g(x=4)=(rC+c)$mod$(N/L)=(1 \times 3+1)$mod$(42/6)=4$;

$g(x=5)=(rC+c)$mod$(N/L)=(2 \times 3+1)$mod$(42/6)=0$;

$g(x=6)=(rC+c)$mod$(N/L)=(0 \times 3+2)$mod$(42/6)=2$;

$g(x=7)=(rC+c)$mod$(N/L)=(1 \times 3+2)$mod$(42/6)=5$; and $g(x=8)=(rC+c)$mod$(N/L)=(2 \times 3+2)$mod$(42/6)=1$.

Because the value of f(x) meets f(x)=g(x+n), and n□{0, 1}, based on a0=0, a1=R·(C−$N_{null}$)+(R−1)=5, and a2=R·(C−$N_{null}$)+2(R−1)=7, it can be learned that when 0≤x<5, and n=0, the value of f(x) is as follows: f(0)=g(0+0)=0; f(1)=g(1+0)=3; f(2)=g(2+0)=6; f(3)=g(3+0)=1; and f(4)=g(4+0)=4.

When 5≤x<7, and n=1, the value of f(x) is as follows: f(5)=g(5+1)=g(6)=2; and f(6)=g(6+1)=g(7)=5. Referring to FIG. 7, the foregoing determined indexes of the M REG bundles do not include the locations of the null elements (or the locations at which the numbers of the REG bundles are repeated).

In this implementation, when one or more CCEs forming a downlink control channel are mapped to the REG bundles in the control resource set, the CCEs are dispersed in the entire control resource set as much as possible, so that a relatively large frequency diversity gain may be obtained for sending/receiving of the downlink control channel.

In a second optional implementation, the at least one offset value includes the offset2, and may further include the offset6.

The value of f(x) meets f(x)=(h(x)−offset2)mod B, where x=cR+r, h(x)=rC+c+$n_{shift}N_{null}$=(C·R−B), C=⌈B/R⌉, r∈{0, 1, . . . , (R−1)}, and c∈{0, 1, . . . , (C−1)}; the value of f(x) meets f(x)=((x mod R)·C+⌊x/C⌋−offset2+$n_{shift}$ mod B; or the value of f(x) meets f(x)=h(x)−offset2 (it should be noted herein that when a value of (h(x)−offset2) is less than B, f(x)=(h(x)−offset2)mod B=h(x)−offset2).

Optionally, the value of h(x) meets h(x)=u(k).

A value of u(k) is equal to (r·C+c), a value of k meets k=(x+$n_{shift}$)mod(B), or (x−$n_{shift}$)mod(B), x=(k+$n_{shift}$)mod(B), or x=(k−$n_{shift}$)mod(B), and values of c and r meet k=cR+r, or k=cR+r+offset6, where $n_{shift}$ is a shift value, and may be determined by the terminal device or the network device. For a specific explanation, refer to a description in a second optional design in the following.

For a value of the offset2, in an optional manner, offset2=max{0, r−(R−$N_{null}$)}, or offset2=max{0, (x mod R)−(R−$N_{null}$)} In this optional manner, referring to FIG. 7, the locations of the null elements are at an end of a last column in the matrix. For determining of indexes of the M REG bundles, the end of the last column needs to be avoided, that is, output of the matrix cannot include $N_{null}$ locations of the end of the last column in the matrix.

Referring to an example 2, the control resource set includes 21 resource blocks consecutive in frequency domain and two OFDM symbols consecutive in time domain, and then a quantity of REGs included in the control resource set is 2×21=42, that is, N=42. When the CCE includes six REGs, the CORESET includes seven CCEs in total, and the CCEs are numbered {0, 1, 2, 3, 4, 5, 6}. If $n_{shift}$=0, L=6, and R=3 are determined through the configuration of the higher layer signaling, in the CORESET, an REG bundle corresponding to a CCE 0 is {f(0)} an REG bundle corresponding to a CCE 1 is {f(1)}, an REG bundle corresponding to a CCE 2 is {f(2)}, an REG bundle corresponding to a CCE 3 is {f(3)}, an REG bundle corresponding to a CCE 4 is {f(4)}, an REG bundle corresponding to a CCE 5 is {f(5)}, and an REG bundle corresponding to a CCE 6 is {f(6)}.

If f(x=1), and R=3, based on x=cR+r, it can be learned that c=0, and r=1. Further, if B=7, C=3, and N, =2, offset2=max{0,r−(R−N)}=max{0, 1−1}=0.

It can be learned from the foregoing description that $f(x=0)=(rc+c+n_{shift}$−offset2)mod B=(0×3+0−0)mod (42/6)=0;

$f(x=1)=(rc+c+n_{shift}$−offset2)mod B=(1×3+0−0)mod (42/6)=3;

$f(x=2)=(rc+c+n_{shift}$−offset2)mod B=(2×3+0−1)mod (42/6)=5;

$f(x=3)=(rc+c+n_{shift}$−offset2)mod B=(0×3+1−0)mod (42/6)=1;

$f(x=4)=(rc+c+n_{shift}$−offset2)mod B=(1×3+1−0)mod (42/6)=4;

$f(x=5)=(rc+c+n_{shift}$−offset2)mod B=(2×3+1−1)mod (42/6)=6; and $f(x=6)=(rc+c+n_{shift}$−offset2)mod B=(0×3+2−0)mod (42/6)=2.

Based on the foregoing implementation, the seven CCEs are mapped to different REG bundles, when one or more CCEs forming a downlink control channel (PDCCH) are mapped to the REG bundles in the control resource set, the CCEs are dispersed in the entire control resource set as much as possible, so that a relatively large frequency diversity gain may be obtained for sending/receiving of the downlink control channel.

In another optional manner, $$\text{offset } 2 = \begin{cases} \min\{r, N_{null}\}, c \neq C-1 \\ \min\{r+N_{null}, N_{null}\} - C \cdot N_{null}, c = C-1 \end{cases}.$$

Figure 8:
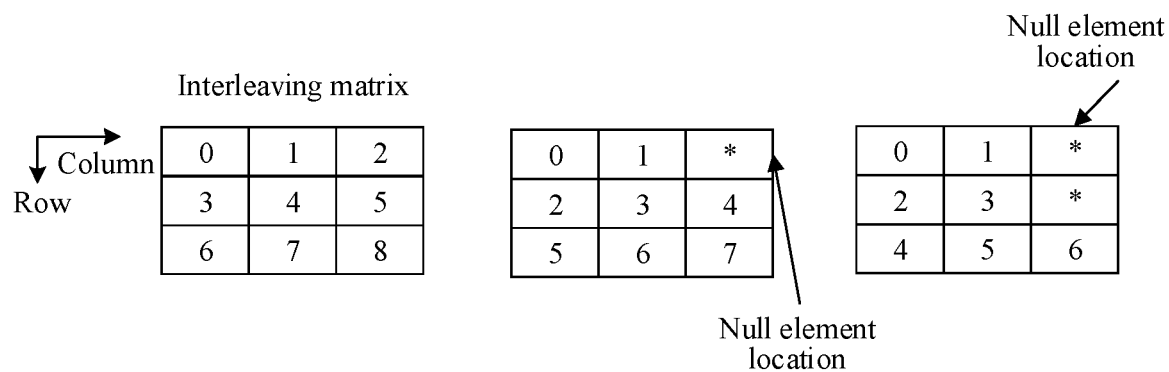
FIG. 8 is a schematic diagram of still other possible interleaved mapping according to an embodiment of the present invention.

In this optional manner, referring to FIG. 8, the locations of the null elements are at a header of a last column in the matrix. For determining of indexes of the M REG bundles, the header of the last column needs to be avoided, that is, output of the matrix cannot include $N_{null}$ locations of the header of the last column in the matrix.

Referring to an example 3, the control resource set includes 21 resource blocks consecutive in frequency domain and two OFDM symbols consecutive in time domain, and then a quantity of REGs included in the control resource set is 2×21=42, that is, N=42. When the CCE includes six REGs, the CORESET includes seven CCEs in total, and the CCEs are numbered {0, 1, 2, 3, 4, 5, 6}. If $n_{shift}$=0, L=6, and R=3 are determined through the configuration of the higher layer signaling, in the CORESET, an REG bundle corresponding to a CCE 0 is {f(0)}, an REG bundle corresponding to a CCE 1 is {f(1)}, an REG bundle corresponding to a CCE 2 is {f(2)}, an REG bundle corresponding to a CCE 3 is {f(3)}, an REG bundle corresponding to a CCE 4 is {f(4)}, an REG bundle corresponding to a CCE 5 is {f(5)}, and an REG bundle corresponding to a CCE 6 is {f(6)}.

If f(x=1), and R=3, based on x=cR+r, it can be learned that c=0, and r=1. Further, if B=7, C=3, $N_{null}$=2, and c<C−1, offset2=max{r, $N_{null}$}=min{1, 2}=1.

It can be learned from the foregoing description that $f(x=0)=(rc+c+n_{shift}$−offset2)mod B=(0×3+0−0)mod (42/6)=0;

$f(x=1)=(rc+c+n_{shift}$−offset2)mod B=(1×3+0−1)mod (42/6)=2;

$f(x=2)=(rc+c+n_{shift}$−offset2)mod B=(2×3+0−2)mod (42/6)=4;

$f(x=3)=(rc+C+n_{shift}$−offset2)mod B=(0×3+1−0)mod (42/6)=1;

$f(x=4)=(rc+C+n_{shift}$−offset2)mod B=(1×3+1−1)mod (42/6)=3;

$f(x=5)=(rc+c+n_{shift}$−offset2)mod B=(2×3+1−2)mod (42/6)=5; and $f(x=6)=(rc+C+n_{shift}$−offset2)mod B=(0×3+2−2+3×2) mod(42/6)=6.

In still another optional manner, the value of offset2 meets offset2=$N_{null}$, where $N_{null}$ meets $N_{null}$=((⌈B/R⌉·R)−B).

For a value of the offset6, when $c \in \{0, 1, 2, \ldots, N-1\}$, the value of the offset6 meets offset6=$(-c-1)$, where $r \in \{1, 2, \ldots, R-1\}$; and/or when $c \in \{N_{null}, N_{null}+1, \ldots, C-1\}$, the value of the offset6 meets offset6=$-N_{null}$, where $r \in \{0, 1, 2, \ldots, R-1\}$.

Based on the foregoing implementation, the seven CCEs are mapped to different REG bundles, when one or more CCEs forming a downlink control channel (PDCCH) are mapped to the REG bundles in the control resource set, the CCEs are dispersed in the entire control resource set as much as possible, so that a relatively large frequency diversity gain may be obtained for sending/receiving of the PDCCH.

In a third optional implementation, the at least one offset value includes the offset3 and may further include the offset6.

The value of f(x) meets $f(x)=(h(x)+\text{offset3}) \mod B$, $x=cR+r$, $h(x)=rC+c+n_{shift}$, $N_{null}=(C \cdot R-B)$, $C=\lceil B/R \rceil$, $r \in \{0, 1, \ldots, (R-1)\}$, and $c \in \{0, 1, \ldots, (C-1)\}$; the value of f(x) meets $f(x)=(x \mod R) \cdot C + \lfloor x/C \rfloor + \text{offset3} + n_{shift}) \mod B$ or the value of f(x) meets $f(x)=(h(x)+\text{offset3})$ (it should be noted herein that when a value of (h(x)+offset3) is less than B, $f(x)=((h(x)+\text{offset3})) \mod B=(h(x)+\text{offset3}))$.

Optionally, the value of h(x) meets h(x)=u(k) A value of u(k) is equal to $(r \cdot C + c)$ a value of k meets $k=(x+n_{shift}) \mod (B)$, $k=(x-n_{shift}) \mod (B)$, $x=(k+n_{shift}) \mod (B)$, or $x=(k-n_{shift}) \mod (B)$, and the values of c and r meet $k=cR+r$, or $k=cR+r+\text{offset6}$, where $n_{shift}$ is a shift value, and may be determined by the terminal device or the network device. For a specific explanation, refer to a description in a second optional design in the following.

In an optional manner, offset3=$\min\{0, (R-N_{null})-r\}$, or offset3=$\min\{0,(R-N_{null})-(x \mod R)\}$ In this optional manner, referring to FIG. 7, the locations of the null elements are at an end of a last column in the matrix. For determining of indexes of the M REG bundles, the end of the last column needs to be avoided, that is, output of the matrix cannot include $N_{null}$ locations of the end of the last column in the matrix.

Referring to an example 4, the control resource set includes 21 resource blocks consecutive in frequency domain and two OFDM symbols consecutive in time domain, and then a quantity of REGs included in the control resource set is $2 \times 21=42$, that is, N=42. When the CCE includes six REGs, the CORESET includes seven CCEs in total, and the CCEs are numbered $\{0, 1, 2, 3, 4, 5, 6\}$. If $n_{shift}=0$, L=6, and R=3 are determined through the configuration of the higher layer signaling, in the CORESET, an REG bundle corresponding to a CCE 0 is $\{f(0)\}$, an REG bundle corresponding to a CCE 1 is $\{f(1)\}$, an REG bundle corresponding to a CCE 2 is $\{f(2)\}$, an REG bundle corresponding to a CCE 3 is $\{f(3)\}$, an REG bundle corresponding to a CCE 4 is $\{f(4)\}$, an REG bundle corresponding to a CCE 5 is $\{f(5)\}$, and an REG bundle corresponding to a CCE 6 is $\{f(6)\}$.

If f(x=1), and R=3, based on x=cR+r, it can be learned that c=0, and r=1. Further, if B=7, C=3, and $N_{null}=2$, offset3=$\min\{0, (R-N_{null})-r\}=\min\{0, 1-1\}=0$.

It can be learned from the foregoing description that $f(x=0)=(rc+c+n_{shift}+\text{offset3}) \mod B=(0 \times 3+0+0) \mod (42/6)=0;$ $f(x=1)=(rc+c+n_{shift}+\text{offset3}) \mod B=(1 \times 3+0+0) \mod (42/6)=3;$ $f(x=2)=(rc+C+n_{shift}+\text{offset3}) \mod B=(2 \times 3+0-1) \mod (42/6)=5;$ $f(x=3)=(rc+C+n_{shift}+\text{offset3}) \mod B=(0 \times 3+1+0) \mod (42/6)=1;$ $f(x=4)=(rC+c+n_{shift}+\text{offset3}) \mod B=(1 \times 3+1+0) \mod (42/6)=4;$ $f(x=5)=(rc+c+n_{shift}+\text{offset3}) \mod B=(2 \times 3+1-1) \mod (42/6)=6;$ and $f(x=6)=(rc+c+n_{shift}+\text{offset3}) \mod B=(0 \times 3+2+0) \mod (42/6)=2.$ Based on the foregoing implementation, the seven CCEs are mapped to different REG bundles, when one or more CCEs forming a downlink control channel (PDCCH) are mapped to the REG bundles in the control resource set, the CCEs are dispersed in the entire control resource set as much as possible, so that a relatively large frequency diversity gain may be obtained for sending/receiving of the PDCCH.

In another optional manner, $$\text{offset 3} = \begin{cases} \max\{-r, -N_{null}\}, c \neq C-1 \\ C \cdot N_{null} + \max\{-(r+N_{null}), -N_{null}\}, c = C-1 \end{cases}.$$

In this optional manner, referring to FIG. 8, the locations of the null elements are at a header of a last column in the matrix. For determining of indexes of the M REG bundles, the header of the last column needs to be avoided, that is, output of the matrix cannot include $N_{null}$ locations of the header of the last column in the matrix.

Referring to the configuration of the control resource set that is the same as that in the example 4, a quantity of REGs included in the control resource set is $2 \times 21=42$. If $n_{shift}=0$, L=6, and R=3 configured by using the higher layer signaling, If f(x=1) and R=3, c=0 and r=1. Further, if B=7, C=3, $N_{null}=2$, and c<C-1, offset3=$\max\{-r, -N_{null}\}=\max\{-1, -2\}=-1$.

It can be learned from the foregoing description that $f(x=0)=(rc+c+n_{shift}+\text{offset3}) \mod B=(0 \times 3+0-0) \mod (42/6)=0;$ $f(x=1)=(rc+C+n_{shift}+\text{offset3}) \mod B=(1 \times 3+0-1) \mod (42/6)=2;$ $f(x=2)=(rc+C+n_{shift}+\text{offset3}) \mod B=(2 \times 3+0-2) \mod (42/6)=4;$ $f(x=3)=(rc+C+n_{shift}+\text{offset3}) \mod B=(0 \times 3+1-0) \mod (42/6)=1;$ $f(x=4)=(rc+C+n_{shift}+\text{offset3}) \mod B=(0 \times 3+1-1) \mod (42/6)=3;$ $f(x=5)=(rc+c+n_{shift}+\text{offset3}) \mod B=(2 \times 3+1-2) \mod (42/6)=5;$ and $f(x=6)=(rc+C+n_{shift}+\text{offset3}) \mod B=(0 \times 3+2-2+3 \times 2) \mod (42/6)=6.$ In this optional implementation, for the value of the offset 6, refer to the description in the second optional implementation.

In a fourth optional implementation, the at least one offset value includes the offset4 and the offset5, and the value of f(x) meets $f(x)=(r \cdot C+c+n_{shift}+\text{offset4}) \mod B$, where $cR+r+\text{offset5}=x$, $C=\lceil B/R \rceil$, $r \in \{0, 1, \ldots, (R-1)\}$, and $c \in \{0, 1, \ldots, (C-1)\}$.

It can be learned from the foregoing description that there are null elements, that is, $N_{null}$ (C·R−B) locations in the matrix, and the network device does not send the control channel at the locations of the null elements. In this case, in a process of detecting the control channel, the terminal device ignores or does not read the $N_{null}$ locations. In this optional implementation, an $m^{th}$ location $e_{null}(m)$ of the $N_{null}$ locations meets the following formula.

Optionally, $$R - \left\lfloor \frac{(N_{null} - m) \cdot R}{N_{null}} \right\rfloor - 1,$$

and $m \in \{1, 2, \ldots N_{null}\}$.

For example, for a matrix in which C=3, a row number of a null element in the matrix is {2} or {1, 2}.

When the last column in the matrix includes one null element, a location of the null element is:

$$R - \left\lfloor \frac{(N_{null} - m) \cdot R}{N_{null}} \right\rfloor - 1 = 3 - \left\lfloor \frac{0 \cdot 3}{1} \right\rfloor - 1 = 2;$$

or when the last column in the matrix includes two null elements, a row number of a first null element location (m=1) in an interleaving matrix is:

$$R - \left\lfloor \frac{(N_{null} - m) \cdot R}{N_{null}} \right\rfloor - 1 = 3 - \left\lfloor \frac{(2-1) \cdot 3}{2} \right\rfloor - 1 = 1,$$

and a row number of a second null element location (m=2) in the interleaving matrix is:

$$R - \left\lfloor \frac{(N_{null} - m) \cdot R}{N_{null}} \right\rfloor - 1 = 3 - \left\lfloor \frac{(2-2) \cdot 3}{2} \right\rfloor - 1 = 2.$$

Further, optionally, an $(m+1)^{th}$ location $e_{null}(m)$ in the $N_{null}$ locations meets the following formula:

$$\left\lfloor \frac{m \cdot R}{N_{null}} \right\rfloor,$$

and $m \in \{0, 1, 2, \ldots N_{null}-1\}$.

In this optional implementation, values of the offset 4 and the offset 5 may be predefined or preconfigured, or may be determined based on a predetermined rule.

Optionally, the value of the offset4 is $-m$, $e_{null}(m) \le r < e_{null}(m+1)$.

Further, optionally, the value of the offset5 is $$\begin{cases} -\left\lfloor \frac{c}{C-1} \right\rfloor m, & N_{null} \ne 4 \\ -2 \cdot \left\lfloor \frac{c}{C-1} \right\rfloor m, & N_{null} = 4 \end{cases}, e_{null}(m) \le r < e_{null}(m+1).$$

Optionally, the value of the offset4 meets offset4=$-N_{null}$, where $N_{null}$ meets $N_{null}=((\lceil B/R \rceil \cdot R) - B)$.

Further, optionally, when $c \in \{0, 1, 2, \ldots, N_{null}-1\}$, the value of the offset5 meets offset5=$(-c-1)$, where $r \in \{1, \ldots, (R-1)\}$; and/or when $c \in \{N_{null}, N_{null}+1, \ldots, C-1\}$, the value of offset5 meets offset5=$-N_{null}$, where $r \in \{0, 1, \ldots, (R-1)\}$.

In a second optional design, the M REG bundles are determined based on the at least one shift value.

In this optional design, the at least one shift value includes the foregoing $n_{shift}$. A value of $n_{shift}$ may be determined by using at least one parameter, and the parameter may be at least one of an offset parameter A, an offset parameter Z, and identification information $n_{id}$. Optionally, a value of A is implicitly obtained, or in other words, the value of A is determined based on a preset rule. For example, the preset rule is specified in a standard or a protocol, or is notified by the network device to the terminal device. Further, optionally, $A \in \{1, 2, 3, 4, 6\}$ and A is a subset of $\{1, 2, 3, 4, 6\}$.

In a first implementation, the value of $n_{shift}$ may be determined by using the offset parameter A or Z, and the offset parameters A and Z are determined by using the parameter P. Further, optionally, the value of A is equal to a value of P, a value of Z is $(N_{symbol}/L) \cdot A$, $N_{symbol}$ is a quantity of OFDM symbols occupied by the control resource set in time domain, and L is a size of a resource element group bundle in the control resource set.

Optionally, P is a frequency domain granularity used for mapping from a virtual physical resource block in a bandwidth part BWP. The frequency domain granularity may be configured by using higher layer signaling, and A or Z is determined based on the frequency domain granularity used for mapping from the virtual physical resource block in the bandwidth part BWP. Further, optionally, a value set of P may be {2, 4}. If the frequency domain granularity is two PRBs, A=2. If the frequency domain granularity is four PRBs, A=4. In this optional manner, a granularity used for mapping from a data channel resource matches an offset used for mapping from a control channel resource, so that a quantity of resource fragments on a system side is reduced and spectrum utilization is improved.

Optionally, P is a location number or index of a time domain OFDM symbol in which a DMRS is located, and A or Z is determined by using the location number or index of the time domain OFDM symbol in which the DMRS is located. For example, if the DMRS is on a fourth OFDM symbol, A=2. If the DMRS is on a third OFDM symbol, A=3.

Optionally, P is a quantity of RBs in frequency domain of a resource corresponding to an REG bundle configured in the control resource set, and A or Z is determined by using the quantity of RBs in frequency domain of the resource corresponding to the REG bundle configured in the control resource set. Further, a value set of P is {2, 3, 6}.

For example, a first control resource set occupies two OFDM symbols in time domain, a size of an REG bundle is 2, a quantity of RBs occupied by the REG bundle in frequency domain is 1, and a CCE in the first control resource set is mapped to a resource element group in an interleaved manner. A second control resource set occupies one OFDM symbol in time domain, a size of an REG bundle is 6, a quantity of RBs occupied by the REG bundle in frequency domain is 6, and a CCE in the second control resource set is mapped to a resource element group in a non-interleaved manner. When the first control resource set and the second control resource set partially or completely overlap on a time-frequency resource, and the CCE in the first control resource set is mapped to the REG in the interleaved manner, a value of an offset parameter obtained by the terminal device is equal to 6, that is, a quantity of RBs in frequency domain of a resource corresponding to the REG bundle configured in the first control resource set. In this implementation, interleaved mapping from the CCE in the first control resource set to the REG bundle may be shifted at a granularity of six RBs in frequency domain, thereby reducing a probability of a conflict between control channel resources in the control resource sets in which the interleaved mapping and non-interleaved mapping are used.

For another example, a first control resource set occupies two OFDM symbols in time domain, a size of an REG bundle is 2, a quantity of RBs occupied by the REG bundle in frequency domain is 1, and a CCE in the first control resource set is mapped to a resource element group in an interleaved manner. A second control resource set occupies two OFDM symbol in time domain, a size of an REG bundle is 6, a quantity of RBs occupied by the REG bundle in frequency domain is 3, and a CCE in the second control resource set is mapped to a resource element group in a non-interleaved manner. When the first control resource set and the second control resource set partially or completely overlap on a time-frequency resource, and a CCE in the first control resource set is mapped to an REG in the interleaved manner, a value of an offset parameter obtained by the terminal device is equal to 3. Interleaved mapping from the CCE in the first control resource set to the REG bundle is shifted at a granularity of three RBs in frequency domain, thereby reducing a probability of a conflict between control channel resources in the control resource sets in which the interleaved mapping and non-interleaved mapping are used.

For another example, a first control resource set occupies two OFDM symbols in time domain, a size of an REG bundle is 2, a quantity of RBs occupied by the REG bundle in frequency domain is 1, and a CCE in the first control resource set is mapped to a resource element group in an interleaved manner. A second control resource set occupies three OFDM symbols in time domain, a size of an REG bundle is 6, a quantity of RBs occupied by the REG bundle in frequency domain is 2, and a CCE in the second control resource set is mapped to a resource element group in a non-interleaved manner. The first control resource set and the second control resource set partially or completely overlap on a time-frequency resource. In this case, when the CCE in the first control resource set is mapped to the REG in the interleaved manner, a value of an offset parameter obtained by the terminal device is equal to 2. Interleaved mapping from the CCE in the first control resource set to the REG bundle is shifted at a granularity of two RBs in frequency domain, thereby reducing a probability of a conflict between control channel resources in the control resource sets in which the interleaved mapping and non-interleaved mapping are used.

In a second implementation, the value of $n_{shift}$ may be determined by using the identification information $n_{id}$. The identification information may be a cell identifier $N_{ID}^{cell}$, or a parameter configured by using higher layer signaling. For example, $N_{ID}^{cell}$ is obtained by the network device by using a synchronization signal and/or a broadcast channel, and $N_{ID}^{cell}$ is used to downlink control information transmission of the control resource set. For another example, the parameter may be a parameter configured by using higher layer signaling. Optionally, a range of the parameter falls within $\{0, 1, \ldots, 274\}$.

In a third implementation, the value of $n_{shift}$ may be determined by using the offset parameter A and the identification information or may be determined by using the offset parameter Z and the identification information A.

Optionally, the value of $n_{shift}$ meets $n_{shift}=A\cdot(N_{symbol}/L)\cdot\lfloor n_{id}/(A\cdot(N_{symbol}/L))\rfloor$, $n_{shift}=A\cdot(N_{symbol}/L)\cdot\lceil n_{id}/(A\cdot(N_{symbol}/L))\rceil$, or $n_{shift}\mod(A)=0$.

Optionally, the value of $n_{shift}$ meets $n_{shift}=A\cdot(N_{symbol}/L)\cdot\lfloor n_{id}/(A\cdot(N_{symbol}/L))\rfloor+N_{null}$, or $n_{shift}=A\cdot(N_{symbol}/L)\cdot\lceil n_{id}/(A\cdot(N_{symbol}/L))\rceil-N_{null}$.

Optionally, the value of $n_{shift}$ meets $n_{shift}=Z\cdot\lfloor n_{id}/Z\rfloor$, $n_{shift}=Z\cdot\lceil n_{id}/Z\rceil$, or $n_{shift}\mod(Z)=0$.

Optionally, the value of $n_{shift}$ meets $n_{shift}=A\cdot(N_{symbol}/L)\cdot n_{id}$, or $n_{shift}=Z\cdot n_{id}$.

In the third implementation, A belongs to $\{2, 4\}$, $\{2, 3, 6\}$, $\{1, 2, 4\}$, $\{1, 2, 3, 6\}$, $\{1, 2, 3, 4, 6\}$, or $\{1\}$, and Z belongs to $\{2, 4\}$, $\{1, 2, 4\}$, $\{2, 3, 6\}$, $\{1, 2, 3, 6\}$, or $\{1\}$. For explanations of Z, A, and d, refer to the first implementation and the second implementation.

In a third optional design, the M REG bundles are determined with reference to the first optional design and the second optional design, and n included in the shift value in the second optional design may be directly applied to the first optional design.

In a fourth optional design, the network device and the terminal device determine that an index of an $(i+1)^{th}$ REG bundle in a $(j+1)^{th}$ control channel element CCE of the control resource set is f(x), a value of x is equal to $(6j/L+i)$, and a value of f(x) meets $f(x)=(rC+c+n_{shift})\mod(C\cdot R)$, or $f(x)=(rC+c+n_{shift})\mod B$, and $x\in\{0, 1, 2, 3, \ldots, C\cdot R-1\}$. For a value set of x, a value set of f(x) is B locations that are different from each other and that are less than B.

When the value of f(x) meets $f(x)=(rC+c+n_{shift})\mod(C\cdot R)$, a number (logical index) x of the REG bundle in the CCE is written into a matrix by row, $x\in\{0, 1, 2, 3, \ldots, C\cdot R-1\}$, and an output of the matrix is B REG bundle locations or indexes that are different from each other and that are less than B. In a matrix mapping process, if a value obtained for an input parameter x is greater than or equal to B, the matrix does not output the value, but continues to perform calculation for a next input parameter, until the matrix outputs B locations that are different from each other and that are less than B.

Figure 4:
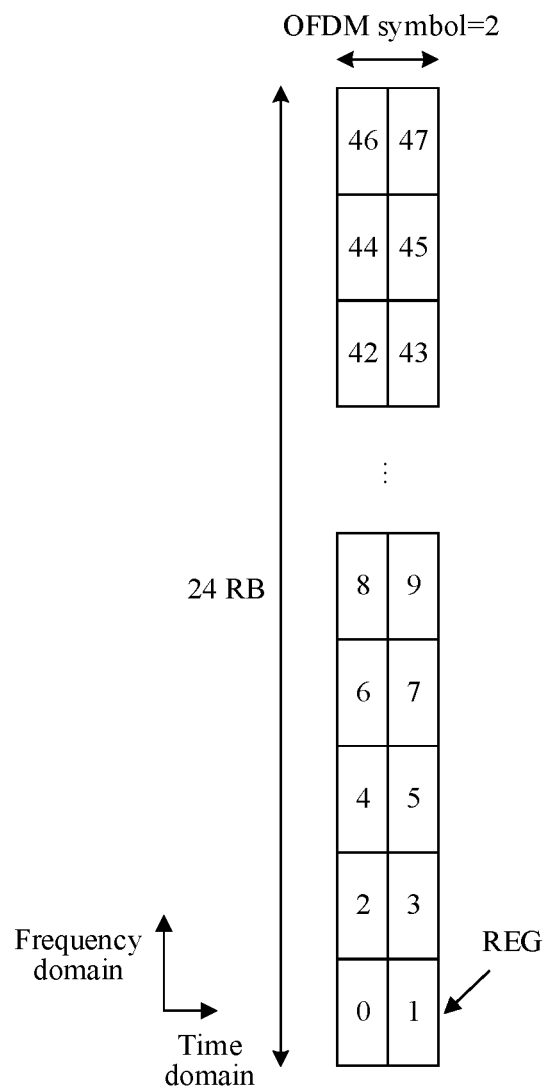
FIG. 4 is a schematic diagram of a possible control resource set according to an embodiment of the present invention.

By using a matrix shown in FIG. 4 as an example, for a specific parameter, refer to a description of FIG. 4. The CORESET includes eight CCEs in total numbered $\{0, 1, 2, 3, 4, 5, 6, 7\}$. An REG bundle corresponding to a CCE 0 is $\{f(0)\}$, an REG bundle corresponding to a CCE 1 is $\{f(1)\}$, an REG bundle corresponding to a CCE 2 is $\{f(2)\}$, an REG bundle corresponding to a CCE 3 is $\{f(3)\}$, an REG bundle corresponding to a CCE 4 is $\{f(4)\}$, an REG bundle corresponding to a CCE 5 is $\{f(5)\}$, an REG bundle corresponding to a CCE 6 is $\{f(6)\}$, and an REG bundle corresponding to a CCE 7 is $\{f(7)\}$. That is, B=8, and $C\cdot R=12$. When $N_{null}=(C\cdot R-B)$ is not 0, there are null element locations. If f(x) meets $f(x)=(rC+c+n_{shift})\mod(C\cdot R)$, a range of x is $\{0, 1, 2, \ldots, 11\}$, and a corresponding REG bundle location is determined as follows.

Specifically, when f(x=0)=0, a location originally corresponding to f(x=4) is 8, which is equal to B, 8 is ignored or is not output. In this case, in output order, a location corresponding to f(x=4) should correspond to a value of f(x=5), that is, 10, which is greater than B, then, 10 is ignored or is not output. Calculation is continued until f(x=6)=1. In this case, in output order, the location corresponding to f(x=4) should correspond to a value of f(x=6), that is, 1. Because x is used as an input parameter, and an input range is greater than an original input range, outputs obtained through sequential calculation are 8 outputs $\{0, 2, 4, 6, 3, 1, 3, 5, 7\}$ that are different from each other and that are less than eight.

When the value of f(x) meets $f(x)=(rC+c+n_{shift})\mod B$ a number (logical index) x of the REG bundle in the CCE is written into a matrix by row, and $x\in\{0, 1, 2, 3, \ldots, C\cdot R-1\}$.

An output of the matrix is B REG bundle locations or indexes that are different from each other and that are less than B. In a matrix mapping process, if a value obtained for an input parameter x is the same as a value corresponding to a previous input parameter, the matrix does not output the repeated value, but continues to perform calculation for a next input parameter, until the matrix outputs B locations that are different from each other and that are less than B.

By using the matrix shown in FIG. 4 as an example, for a specific parameter, refer to the description of FIG. 4. The CORESET includes eight CCEs in total numbered {0, 1, 2, 3, 4, 5, 6, 7}. An REG bundle corresponding to a CCE 0 is {f(0)}, an REG bundle corresponding to a CCE 1 is {f(1)}, an REG bundle corresponding to a CCE 2 is {f(2)}, an REG bundle corresponding to a CCE 3 is {f(3)}, an REG bundle corresponding to a CCE 4 is {f(4)}, an REG bundle corresponding to a CCE 5 is {f(5)}, an REG bundle corresponding to a CCE 6 is {f(6)}, and an REG bundle corresponding to a CCE 7 is {f(7)}. That is, B=8, and C·R=12. When $N_{null}$=(C·R−B) is not 0, there are $N_{null}$ null element locations. If f(x) meets f(x)=(rC+c+$n_{shift}$)mod B, a range of x is {0, 1, 2, . . . , 11}, and a corresponding REG bundle location is determined as follows.

Specifically, when f(x=0)=0, a location originally corresponding to f(x=4) is also 0, repetition is generated. Therefore, in output order, the location corresponding to f(x=4) should correspond to a value of f(x=5), that is, 2, which is also repeated with a value of f(x=1). In this case, in output order, the location corresponding to f(x=4) should correspond to a value of f(x=6), that is, 1. Because x is used as an input parameter, and an input range is greater than an original input range, outputs obtained through sequential calculation are 8 outputs {0, 2, 4, 6, 3, 1, 3, 5, 7} that are different from each other and that are less than eight.

In an optional design, the control resource set includes B resource element group bundles, and a value of B is less than or equal to (C·R). When interleaving mapping of CCE-to-REG bundle is performed by using the matrix, a number (logical index) of an REG bundle in the CCE is written into the matrix by row, and an index of a physical REG bundle obtained after the mapping is read by column. When B is less than (C·R), a quantity of null elements is $N_{null}$=C·R−B, and locations of the null elements are determined in the following optional manners.

Optionally, the null elements are located in the last $N_{null}$ rows of the last column.

Optionally, the null elements are located in the first $N_{null}$ rows of the last column.

Optionally, a row number of the following row location of the last column in which the null elements are located meets $$R - \left\lfloor \frac{(N_{null} - m) \cdot R}{N_{null}} \right\rfloor - 1, m \in \{1, \dots, N_{null}\}.$$

Figure 9:
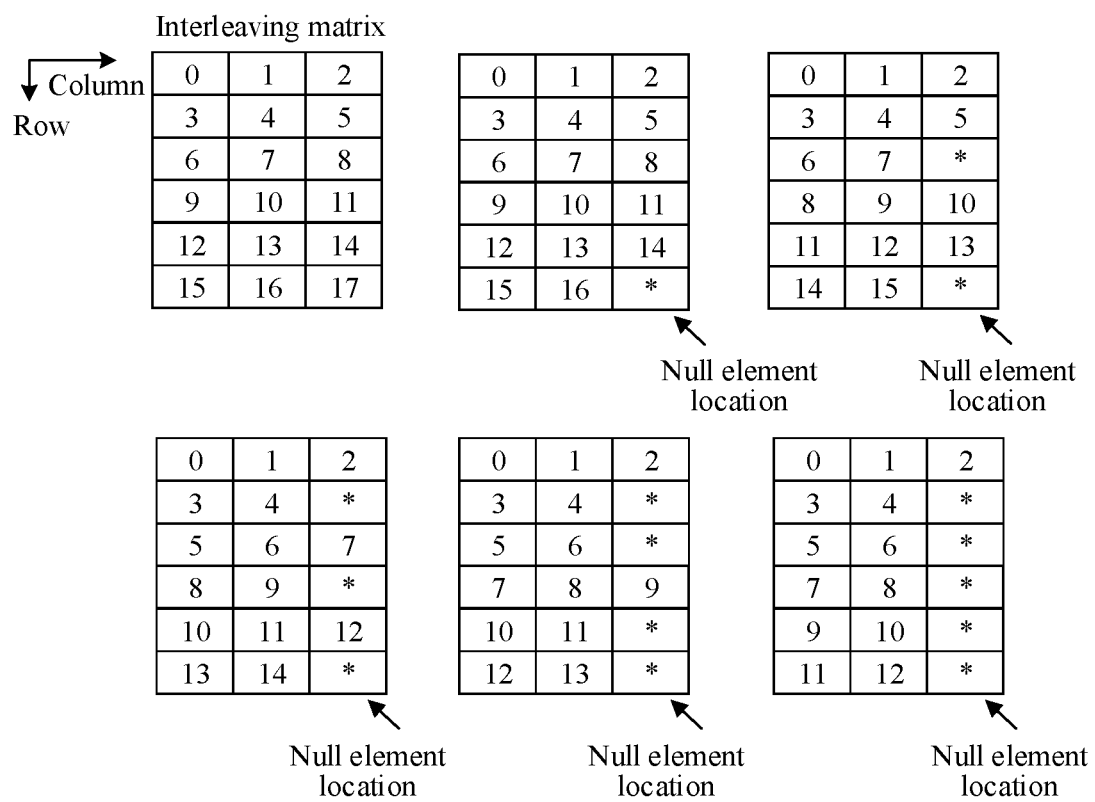
FIG. 9 is a schematic diagram of yet other possible interleaved mapping according to an embodiment of the present invention.

When R=6, $N_{null}$ is one of 1 to 5. For example, when is 1, a row number is 5. When is 4, row numbers are 1, 2, 4, and 5. For details, refer to FIG. 9.

Optionally, a column number of the following column location of the last row in which the null elements are located meets $$C - \left\lfloor \frac{(N_{null} - m) \cdot C}{N_{null}} \right\rfloor - 1, m \in \{1, \dots, N_{null}\}.$$

Optionally, a row number of the following row location of the last column in which the null elements are located meets $$\left\lfloor \frac{m \cdot R}{N_{null}} \right\rfloor, m \in \{0, 1, \dots, N_{null} - 1\}.$$

Optionally, a column number of the following column location of the last row in which the null elements are located meets $$\left\lfloor \frac{m \cdot C}{N_{null}} \right\rfloor, m \in \{0, 1, \dots, N_{null} - 1\}.$$

The row location is a row number corresponding to a row in the matrix in ascending order.

For example, if the row number is 0, the row location in the matrix is a first row arranged in the matrix in order from top to bottom.

If the row number is 1, the row location in the matrix is a second row arranged in the matrix in order from top to bottom.

If the row number is 2, the row location in the matrix is a third row arranged in the matrix in order from top to bottom.

The foregoing mainly describes, from the perspective of interaction between network elements, the solutions provided in this embodiment of the present invention. It may be understood that, to implement the foregoing functions, the network elements, such as the network device and the terminal device, include a corresponding hardware structure and/or software module for performing each of the functions. A person skilled in the art should easily be aware that, in combination with the examples described in the embodiments disclosed in this specification, units and algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

The following further provides a description based on a possible structure of the terminal device in FIG. 3. The terminal device can perform any method in the embodiments of the present invention. The terminal device may include at least a transceiver 301 and a processor 304 (the processor is a general expression herein, and may represent a modem processor 304 or integration of a modem processor 304 and an application processor 302). Optionally, a memory in FIG. 3 and another component in the description with respect to FIG. 3 may be further included. Herein, the transceiver 301 may include an independent receiver and an independent transmitter, to separately perform corresponding receiving and sending functions, or may be a transceiver that integrates the receiving and sending functions. No further limitation is imposed herein. The transceiver 301 in FIG. 3 may be structurally split into a receiver 301A and a transmitter 301B. The terminal device is merely used as an optional main body for an example description herein. The following description is made by using a wireless apparatus as a main body, and the wireless apparatus may be a unit, a chip or a component included in a terminal device, or a terminal device.

The wireless apparatus includes the processor 304 and the receiver 301A.

The processor 304 determines M resource element group bundles in a control resource set.

The processor 304 detects a control channel on resources corresponding to the M resource element group bundles, where M is greater than or equal to 1.

Optionally, the receiver 301A is configured to receive the control channel.

Optionally, the apparatus further includes the transmitter 301B.

In an optional design, the processor determines the M resource element group bundles based on at least one offset value and/or shift value, where the at least one offset value and/or shift value are/is determined based on a value of $((\lceil B/R \rceil \cdot R) - B)$.

A value of B is less than or equal to $(\lceil B/R \rceil \cdot R)$, and R is an interleaving parameter obtained by the processor or the terminal device.

Optionally, the at least one offset value is determined based on the value of $((\lceil B/R \rceil \cdot R) - B)$, and at least one of a row number r and a column number c.

In an optional design, the at least one offset value includes at least one of an offset1, an offset2, an offset3, an offset4, and an offset5. The processing unit determines that an index of an $(i+1)^{th}$ resource element group bundle in a $(j+1)$ control channel element of the control resource set is $f(x)$, where a value of x is equal to $(6j/L+i)$, and L is a size of a resource element group bundle.

A value of $f(x)$ meets one of the following formulas:

$f(x)=g(x+\text{offset1})$;

$f(x)=(rC+c+n_{shift})\bmod B$, where $x=cR+r-\text{offset1}$;

$f(x)=(h(x)-\text{offset2})\bmod B$, or $f(x)=h(x)-\text{offset2}$;

$f(x)=((x \bmod R)\cdot C+\lfloor x/C \rfloor-\text{offset2}+n_{shift})\bmod B$;

$f(x)=(h(x)+\text{offset3})\bmod B$, or $f(x)=h(x)+\text{offset3}$;

$f(x)=((x \bmod R)\cdot C+\lfloor x/C \rfloor+\text{offset3}+n_{shift})\bmod B$; and $f(x)=(r\cdot C+c+n_{shift}+\text{offset4})\bmod B$, and $cR+r+\text{offset5}=x$, where $g(z)=h(z)\bmod B$, or $g(z)=h(z)$, and x,z, the offset1, the offset2, the offset3, the offset4, and the offset5 are integers.

In an optional design, $\text{offset2}=\max\{0,r-(R-N_{null})\}$, or $\text{offset2}=\max\{0,(x \bmod R)-(R-N_{null})\}$.

In an optional design, $$\text{offset }2 = \begin{cases} \min\{r, N_{null}\}, c \neq C-1 \\ \min\{r + N_{null}, N_{null}\} - C \cdot N_{null}, c = C-1 \end{cases}.$$

In an optional design, $\text{offset3}=\min\{0, (R-N_{null}-r)\}$, or $\text{offset3}=\min\{0, (R-N_{null})-(x \bmod R)\}$.

In an optional design, $$\text{offset }3 = \begin{cases} \max\{-r, -N_{null}\}, c \neq C-1 \\ C \cdot N_{null} + \max\{-(r + N_{null}), -N_{null}\}, c = C-1 \end{cases}.$$

In an optional design, an $(m+1)^{th}$ location $e_{null}(m)$ in $N_{null}$ locations meets the following formula:

$$e_{null}(m) = R - \left\lfloor \frac{(N_{null} - m) \cdot R}{N_{null}} \right\rfloor - 1,$$

where $m \in \{1, 2, \ldots N_{null}\}$; or $$e_{null}(m) = \left\lfloor \frac{m \cdot R}{N_{null}} \right\rfloor,$$

where $m \in \{0, 1, 2, \ldots N_{null}-1\}$.

Optionally, a value of offset4 is $-m$, $e_{null}(m) \leq r < e_{null}(m+1)$.

Optionally, a value of offset5 is $$\begin{cases} -\left\lfloor \frac{c}{C-1} \right\rfloor m, N_{null} \neq 4 \\ -2 \cdot \left\lfloor \frac{c}{C-1} \right\rfloor m, N_{null} = 4 \end{cases}, e_{null}(m) \leq r < e_{null}(m+1).$$

In an optional design, the processor determines the M resource element group bundles based on the at least one shift value. The at least one shift value includes the foregoing $n_{shift}$. A value of $n_{shift}$ may be determined by using at least one parameter, and the parameter may be at least one of an offset parameter A, an offset parameter Z, and identification information $n_{id}$.

Optionally, the value of $n_{shift}$ may be determined by using the offset parameter A or Z, and the offset parameters A and Z are determined by using a parameter P. Further, optionally, a value of A is equal to a value of P, a value of Z is $(N_{symbol}/L) \cdot A$, and $N_{symbol}$ is a quantity of OFDM symbols occupied by the control resource set in time domain.

Optionally, the value of $n_{shift}$ may be determined by using the identification information $n_{id}$. The identification information may be a cell identifier $N_{ID}^{cell}$, or a parameter configured by using higher layer signaling.

Optionally, the value of $n_{shift}$ may be determined by using the offset parameter A and the identification information $n_{id}$, or may be determined by using the offset parameter Z and the identification information $n_{id}$.

For example, the value of $n_{shift}$ meets $n_{shift}=A\cdot(N_{symbol}/L)\cdot\lfloor N_{id}/(A\cdot(N_{symbol}/L))\rfloor$, $n_{shift}=A\cdot(N_{symbol}/L)\cdot\lceil n_{id}/(A\cdot(N_{symbol}/L))\rceil$, or $n_{shift} \bmod(A)=0$.

For another example, the value of $n_{shift}$ meets $n_{shift}=A\cdot(N_{symbol}/L)\cdot\lfloor n_{id}/(A\cdot(N_{symbol}/L))\rfloor+N_{Null}$, or $n_{shift}=A\cdot(N_{symbol}/L)\cdot\lceil n_{id}/(A\cdot(N_{symbol}/L))\rceil-N_{Null}$.

For another example, the value of $n_{shift}$ meets $n_{shift}=Z\cdot\lfloor n_{id}/Z\rfloor$, $n_{shift}=Z\cdot\lceil n_{id}/Z\rceil$, or $n_{shift} \bmod(Z)=0$.

For another example, the value of $n_{shift}$ meets $n_{shift}=A\cdot(N_{symbol}/L)\cdot n_{id}$, or $n_{shift}=Z\cdot n_{id}$.

In an optional design, the processor determines that an index of an $(i+1)^{th}$ REG bundle in a $(j+1)^{th}$ control channel element CCE of the control resource set is $f(x)$, a value of x is equal to $(6j/L+i)$, and a value of $f(x)$ meets $f=f(x)=(rC+c+n_{shift})\bmod(C\cdot R)$, or $f(x)=(rC+c+n_{shift})\bmod B$, and $x \in \{0, 1, 2, 3, \ldots, C\cdot R-1\}$. A value set of $f(x)$ is B indexes or locations that are different from each other and that are less than B.

It should be noted that, for a specific implementation of a communication method performed by the wireless apparatus, reference may be made to the description of the communication method provided in the embodiments of the present invention. The terminal device in this embodiment of the present invention and the communication method corresponding to FIG. 5 are based on a same concept, and technical effects brought by the terminal device are the same as those brought by the foregoing communication method. Specific functions of the processor and the receiver that are included in the wireless apparatus in this embodiment of the present invention and any feature, term, and implementation details related to the functions are corresponding to the functions of the terminal device in the method embodiment corresponding to FIG. 5. For specific content, reference may be made to the description in the method embodiment corresponding to FIG. 5 in the present invention, and details are not described herein again.

It should be noted that, in the foregoing embodiment, the wireless apparatus may be completely or partially implemented by using software, hardware, firmware, or any combination thereof.

Figure 10:
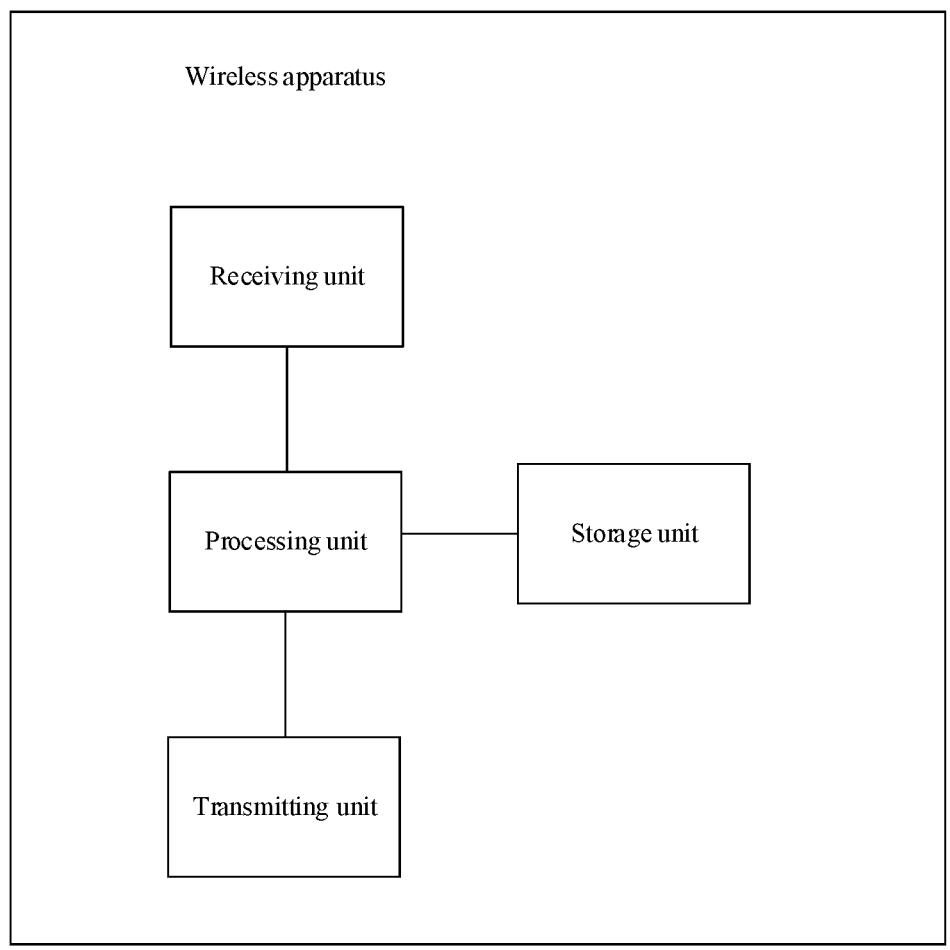
FIG. 10 is a possible schematic structural diagram of a wireless apparatus according to an embodiment of the present invention.

For a structure of the wireless apparatus, in another optional manner, a corresponding component in the foregoing embodiment may be implemented by corresponding hardware, or may be implemented by corresponding hardware by executing corresponding software. For example, the receiver 301A may be hardware that has the foregoing receiving function. For example, the receiver 301A is a transceiver that integrates receiving and sending functions or a receiver implementing only a receiving function, may be a general processor or another hardware device that can execute a corresponding computer program to complete the foregoing function, or may be a software module or a function unit that performs a corresponding function, for example, a receiving unit. For another example, the processor 304 may be hardware that can perform a function of the processor, for example, a processor having a specific function, or a general processor, may be another hardware device that can execute a corresponding computer program to complete the foregoing function, or may be a software module or a function unit that performs a corresponding function, for example, a processing unit. For another example, the transmitter 301B may be hardware that can perform the sending function, for example, a transceiver that integrates receiving and sending functions, or a transmitter that implements only a sending function, may be a general processor or another hardware device that can execute a corresponding computer program to implement the foregoing function, or may be a software module or a function unit that performs a corresponding function, for example, a transmitting unit. Optionally, the wireless apparatus may further include a storage unit. For details, refer to FIG. 10.

The following further describes a possible structure of the network device in FIG. 2. The network device can perform any method in the embodiments of the present invention. The network device may include at least a controller or processor 201 (the processor 201 is used as an example for description in the following) and a transceiver 202. Optionally, a memory in FIG. 2 and another component in the description with respect to FIG. 2 may be further included. Herein, the transceiver 202 may include an independent receiver and an independent transmitter, to separately perform corresponding receiving and sending functions, or may be a transceiver that integrates the receiving and sending functions. No further limitation is imposed herein. The transceiver 202 in FIG. 2 may be structurally split into a receiver 202A and a transmitter 202B. The network device is merely used as an optional main body for an example description herein. The following description is made by using a wireless apparatus as a main body, and the wireless apparatus may be a unit, a chip or a component included in a network device, or a network device.

The wireless apparatus includes the processor 201 and the transmitter 202B.

The processor 201 determines M resource element group bundles in a control resource set.

The transmitter 202B sends a control channel on resources corresponding to the M resource element group bundles, where M is greater than or equal to 1. Optionally, the wireless apparatus further includes the receiver 202A.

The processor 201 determines the M resource element group bundles based on at least one offset value and/or shift value, where the at least one offset value and/or shift value are/is determined based on a value of $((\lceil B/R \cdot R \rceil) - B)$.

A value of B is less than or equal to $(\lceil B/R \cdot R \rceil)$, and R is an interleaving parameter obtained by the processing unit or a terminal device.

Optionally, the at least one offset value is determined based on a value of $((\lceil B/R \cdot R \rceil) - B)$, and at least one of a row number r and a column number c.

In an optional design, the at least one offset value includes at least one of an offset1 an offset2, an offset3, an offset4, and an offset5.

The processor determines that an index of an $(i+1)^{th}$ resource element group bundle in a $(i+1)^{th}$ control channel element of the control resource set is f(x), where a value of x is equal to (6j/L+i), and L is a size of a resource element group bundle.

A value of f(x) meets one of the following formulas:

$f(x)=g(x+\text{offset1})$;

$f(x)=(rC+c+n_{shift})\mod B$, where $x=cR+r-\text{offset1}$;

$f(x)=(h(x)-\text{offset2})\mod B$, or $f(x)=h(x)-\text{offset2}$;

$f(x)=((x \mod R)\cdot C+\lfloor x/C \rfloor-\text{offset2}+n_{shift})\mod B$;

$f(x)=(h(x)+\text{offset3})\mod B$, or $f(x)=h(x)+\text{offset3}$;

$f(x)=((x \mod R)\cdot C+\lfloor x/C \rfloor+\text{offset3}+n_{shift})\mod B$; and $f(x)=(r\cdot C+c+n_{shift}+\text{offset4})\mod B$, and $cR+r+\text{offset5}=x$, where $g(z)=h(z)\mod B$, or $g(z)=h(z)$, and x,z, the offset1, the offset2, the offset3, the offset4, and the offset5 are integers.

In an optional design, the processor 201 further determines the M resource element group bundles based on the at least one shift value. The at least one shift value includes the foregoing $n_{shift}$. A value of $n_{shift}$ may be determined by using at least one parameter, and the parameter may be at least one of an offset parameter A, an offset parameter Z, and identification information $n_{id}$.

It should be noted that, for a specific implementation of a communication method performed by the wireless apparatus, reference may be made to the description of the communication method provided in the embodiments of the present invention. The network device in this embodiment of the present invention and the communication method corresponding to FIG. 5 are based on a same concept, and technical effects brought by the network device are the same as those brought by the foregoing control resource obtaining method. Specific functions of the processor and the transmitter that are included in the wireless apparatus in this embodiment of the present invention and any feature, term, and implementation details related to the functions are corresponding to the functions of the network device in the method embodiment corresponding to FIG. 5. For specific content, reference may be made to the description in the method embodiment corresponding to FIG. 5 in the present invention, and details are not described herein again.

It should be noted that, in the foregoing embodiment, the wireless apparatus may be completely or partially implemented by using software, hardware, firmware, or any combination thereof.

For a structure of the wireless apparatus, in another optional manner, a corresponding component in the foregoing embodiment may be implemented by corresponding hardware, or may be implemented by corresponding hardware by executing corresponding software. For example, the transmitter 202B may be hardware that has the foregoing sending function. For example, the transmitter 202B is a transceiver that integrates receiving and sending functions or a transmitter implementing only a receiving function, may be a general processor or another hardware device that can execute a corresponding computer program to complete the foregoing function, or may be a software module or a function unit that performs a corresponding function, for example, a transmitting unit. For another example, the processor 201 may be hardware that can perform a function of the processor, for example, a processor having a specific function, or a general processor, may be another hardware device that can execute a corresponding computer program to complete the foregoing function, or may be a software module or a function unit that performs a corresponding function, for example, a processing unit. For another example, the receiver 202A may be hardware that can perform the receiving function, for example, a transceiver that integrates receiving and sending functions, or a receiver that implements only a receiving function, may be a general processor or another hardware device that can execute a corresponding computer program to complete the foregoing function, or may be a software module or a function unit that performs a corresponding function, for example, a receiving unit. Optionally, the wireless apparatus may further include a storage unit. For details, refer to FIG. 10.

It may be understood that the accompanying drawings merely show a simplified design of the wireless apparatus. In actual application, the wireless apparatus may include any quantity of transmitters, receivers, processors, controllers, memories, communications units, and the like.

An embodiment of the present invention further provides a communications system, including at least one network device and at least one terminal device that are mentioned in the foregoing embodiments of the present invention.

An embodiment of the present invention further provides an apparatus (for example, an integrated circuit, a wireless device, or a circuit module) configured to implement the foregoing communication method. The apparatus for implementing a power tracker and/or a power supply generator described in this specification may be a self-supporting device or may be a part of a larger device. The device may be: (i) a self-supporting IC; (ii) a set having one or more ICs, where the set may include a memory IC for storing data and/or an instruction; (iii) an RFIC, such as an RF receiver or an RF transmitter/receiver; (iv) an ASIC, such as a mobile station modem; (v) a module that may be embedded in another device; (vi) a receiver, a cellular phone, a wireless device, a handheld device, or a mobile unit; or (vii) others.

The method and the apparatus provided in the embodiments of the present invention may be applied to a terminal device or a network device (which may be collectively referred to as wireless devices. The terminal device, the network device, or the wireless device may include a hardware layer, an operating system layer running above the hardware layer, and an application layer running above the operating system layer. The hardware layer includes hardware such as a central processing unit (central processing unit, CPU), a memory management unit (memory management unit, MMU), and a memory (also referred to as a main memory). This operating system may be any one or more computer operating systems that implement service processing by using a process (process), for example, a Linux operating system, a Unix operating system, an Android operating system, an iOS operating system, or a Windows operating system. The application layer includes applications such as a browser, an address book, word processing software, and instant messaging software. In addition, in the embodiments of the present invention, a specific structure of an execution body of the method is not limited in the embodiments of the present invention provided that a program that records code of the method in the embodiments of the present invention can be run to perform communication based on a signal transmission method in the embodiments of the present invention. For example, the wireless communication method in the embodiments of the present invention may be executed by a terminal device or a network device, or may be executed by a function module that is in the terminal device or the network device and that can invoke and execute a program.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or another programmable apparatus.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

When the functions are implemented in the form of a software function unit and sold or used as an independent product, the functions may be stored in a computer-readable storage medium. Based on such an understanding, the technical solutions of the embodiments of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communication method, comprising:
   determining, by a terminal device, M resource element group bundles in a control resource set; and
   detecting, by the terminal device, a control channel on resources corresponding to the M resource element group bundles, wherein M is an integer greater than or equal to 1;
   wherein the control resource set includes B resource element group bundles, wherein B is an integer; and
   the determining, by a terminal device, M resource element group bundles in a control resource set comprises:
   determining, by the terminal device, the M resource element group bundles based on at least one offset value and/or shift value, wherein the at least one offset value and/or shift value are/is determined based on a value of $((\lceil B/R \rceil \cdot R) - B)$,
   a value of B is less than or equal to $(\lceil B/R \rceil \cdot R)$, and R is an interleaving parameter obtained by the terminal device.

2. The method according to claim 1, wherein
   the at least one offset value comprises at least one of an offset1, an offset2, an offset3, and an offset6; and
   the determining, by the terminal device, the M resource element group bundles based on at least one offset value comprises:
   determining, by the terminal device, that an index of an $(i+1)^{th}$ resource element group bundle in a $(j+1)^{th}$ control channel element of the control resource set is $f(x)$, wherein a value of x is equal to $(6j/L+i)$, L is a size of a resource element group bundle, and
   a value of $f(x)$ meets one of the following formulas:

$f(x)=g(x+\text{offset1})$;

$f(x)=(h(x)-\text{offset2})\mod B$, or $f(x)=h(x)-\text{offset2}$; and $f(x)=(h(x)+\text{offset3})\mod B$, or $f(x)=h(x)+\text{offset3}$;
   wherein $g(z)=h(z)\mod B$, or $g(z)=h(z)$, and $x,z$, the offset1, the offset2, and the offset3 are integers.

3. The method according to claim 2, wherein offset $1=n$, and $a_n \le x < a_{n+1}$, where $n \in \{0, 1, \ldots N_{null}-1\}$, and $$a_n = \begin{cases} 0, n = 0 \\ R \cdot (C - N_{null}) + n(R-1), n \ne 0 \end{cases},$$

wherein $N_{null}=C \cdot R-B$, and $C=\lceil B/R \rceil$.

4. The method according to claim 2, wherein $$\text{offset } 2 = \max\{0, r - (R - N_{null})\}; \text{ or}$$

$$\text{offset } 2 = \begin{cases} \min\{r, N_{null}\}, c \ne C-1 \\ \min\{r + N_{null}, N_{null}\} - C \cdot N_{null}, c = C-1 \end{cases},$$

wherein
$N_{null}=(C \cdot R-B)$, $C=\lceil B/R \rceil$, $r \in \{0, 1, \ldots, (R-1)\}$, and $c \in \{0, 1, \ldots, (C-1)\}$.

5. The method according to claim 2, wherein $$\text{offset } 3 = \min\{0, (R - N_{null} - r)\}; \text{ or}$$

$$\text{offset } 3 = \begin{cases} \max\{-r, -N_{null}\}, c \ne C-1 \\ C \cdot N_{null} + \max\{-(r + N_{null}), -N_{null}\}, c = C-1 \end{cases},$$

wherein
$N_{null}=(C \cdot R-B)$, $C=\lceil B/R \rceil$, $r \in \{0, 1, \ldots, (R-1)\}$, and $c \in \{0, 1, \ldots, (C-1)\}$.

6. The method according to claim 2, wherein
   a value of $h(x)$ meets $h(x)=u(x)+n_{shift}$;
   a value of $u(x)$ is equal to $(r \cdot C+c)$, wherein $x=cR+r$; and
   a value of $n_{shift}$ is equal to $A \cdot n_{id} \cdot (N_{symbol}/L)$, wherein A is an offset parameter obtained by the terminal device, $n_{id}$ is identification information obtained by the terminal device, and $N_{symbol}$ is a quantity of symbols occupied by the control resource set in time domain.

7. The method according to claim 2, wherein
   a value of $h(x)$ meets $h(x)=u(k)$, wherein
   a value of $u(k)$ is equal to $(r \cdot C+c)$, a value of k meets $k=(x+n_{shift}) \mod(B)$, $k=(x-n_{shift}) \mod(B)$, $x=(k+n_{shift}) \mod(B)$, or $x=(k-n_{shift}) \mod(B)$, and values of c and r meet $k=cR+r$, or $k=cR+r+\text{offset6}$, wherein
   $n_{shift}$ is a shift value.

8. The method according to claim 1, wherein
   the at least one offset value comprises an offset4 and an offset5; and
   the determining, by the terminal device, the M resource element group bundles based on at least one offset value comprises:
   determining, by the terminal device, that an index of an $(i+1)^{th}$ resource element group bundle in a $(j+1)^{th}$ control channel element of the control resource set is $f(x)$, wherein a value of x is equal to $(6j/L+i)$, L is a size of a resource element group bundle, and
   a value of $f(x)$ meets the following formula:

$f(x)=(r \cdot C+c+n_{shift}+\text{offset4}) \mod B$, wherein $cR+r+\text{offset5}=x$, and $C=\lceil B/R \rceil$.

9. The method according to claim 1, wherein
   the determining, by a terminal device, M resource element group resource element group bundles in a control resource set comprises:
   obtaining, by the terminal device, the M resource element group bundles by using a matrix, wherein the matrix further comprises a row location that meets the following formula and that is used to fill in $N_{null}$ resource element bundles or $N_{null}$ null elements:

$$R - \left\lfloor \frac{(N_{null} - m) \cdot R}{N_{null}} \right\rfloor - 1, m \in \{1, 2, \ldots N_{null}\}; \text{ or}$$

$$\left\lfloor \frac{m \cdot R}{N_{null}} \right\rfloor, m \in \{0, 1, 2, \ldots N_{null}-1\},$$

wherein
$N_{null}=(C \cdot R-B)$, $C=\lceil B/R \rceil$.

10. A communication method, comprising:
    determining, by a terminal device, M resource element group bundles in a control resource set; and
    detecting, by the terminal device, a control channel on resources corresponding to the M resource element group bundles, wherein M is an integer greater than or equal to 1, wherein the determining, by a terminal device, M resource element group bundles in a control resource set comprises:
determining, by the terminal device, the M resource element group bundles based on at least one shift value, wherein the at least one shift value is determined based on an offset parameter and identification information that are obtained by the terminal device.

11. A wireless apparatus, comprising a processor and a receiver, wherein
the processor is configured to determine M resource element group bundles in a control resource set; and
the processor is further configured to detect a control channel on resources corresponding to the M resource element group bundles, wherein M is an integer greater than or equal to 1,
wherein the control resource set consists of B resource element group resource element group bundles; and
the processor determines the M resource element group bundles based on at least one offset value and/or shift value, wherein the at least one offset value and/or shift value are/is determined based on a value of $((\lceil B/R \rceil \cdot R) - B)$,
a value of B is less than or equal to $(\lceil B/R \rceil \cdot R)$, and R is an interleaving parameter obtained by the processor.

12. The wireless apparatus according to claim 11, wherein the at least one offset value comprises at least one of an offset1, an offset2, an offset3, and an offset6; and
the processor determines that an index of an $(i+1)^{th}$ resource element group bundle in a $(j+1)^{th}$ control channel element of the control resource set is f(x), wherein a value of x is equal to (6j/L+i), L is a size of a resource element group bundle, and
a value of f(x) meets one of the following formulas:

$f(x)=g(x+\text{offset1})$;

$f(x)=(h(x)-\text{offset2})\bmod B$, or $f(x)=h(x)-\text{offset2}$; and $f(x)=(h(x)+\text{offset3})\bmod B$, or $f(x)=h(x)+\text{offset3}$;
wherein $g(z)=h(z)\bmod B$, or $g(z)=h(z)$, and x,z, the offset1, the offset2, and the offset3 are integers.

13. The wireless apparatus according to claim 12, wherein offset1=n, and $a_n \le x < a_{n+1}$, where $n \in \{0, 1, \ldots N_{null}-1\}$, and $$a_n = \begin{cases} 0, n = 0 \\ R \cdot (C - N_{null}) + n(R-1), n \ne 0 \end{cases},$$

wherein $N_{null}=(C \cdot R-B)$, and $C=\lceil B/R \rceil$.

14. The wireless apparatus according to claim 12, wherein $$\text{offset } 2 = \max\{0, r - (R - N_{null})\}; \text{ or}$$

$$\text{offset } 2 = \begin{cases} \min\{r, N_{null}\}, c \ne C - 1 \\ \min\{r + N_{null}, N_{null}\} - C \cdot N_{null}, c = C - 1 \end{cases},$$

wherein
$N_{null}=(C \cdot R-B)$, $C=\lceil B/R \rceil$, $r \in \{0, 1, \ldots, (R-1)\}$, and $c \in \{0, 1, \ldots, (C-1)\}$.

15. The wireless apparatus according to claim 12, wherein $$\text{offset } 3 = \min\{0, (R - N_{null} - r)\}; \text{ or}$$

$$\text{offset } 3 = \begin{cases} \max\{-r, -N_{null}\}, c \ne C - 1 \\ C \cdot N_{null} + \max\{-(r + N_{null}), -N_{null}\}, c = C - 1 \end{cases},$$

wherein
$N_{null}=(C \cdot R-B)$, $C=\lceil B/R \rceil$, $r \in \{0, 1, \ldots, (R-1)\}$, and $c \in \{0, 1, \ldots, (C-1)\}$.

16. The wireless apparatus according to claim 12, wherein
a value of h(x) meets $h(x)=u(x)+n_{shift}$;
a value of u(x) is equal to $(r \cdot C+c)$, wherein $x=cR+r$; and
a value of $n_{shift}$ is equal to $A \cdot n_{id} \cdot (N_{symbol}/L)$, wherein A is an offset parameter obtained by the processor, $n_{id}$ is identification information obtained by the processor, and $N_{symbol}$ is a quantity of symbols occupied by the control resource set in time domain.

17. The method according to any one of claim 12 wherein
a value of h(x) meets h(x)=u(k), wherein
a value of u(k) is equal to $(r \cdot C+c)$, a value of k meets $k=(x+n_{shift}) \bmod(B)$, $k=(x-n_{shift}) \bmod(B)$, $x=(k+n_{shift}) \bmod(B)$, or $x=(k-n_{shift}) \bmod(B)$, and values of c and r meet $k=cR+r$, or $k=cR+r+\text{offset6}$, wherein
$n_{shift}$ is a shift value.

* * * * *

UNITED STATES PATENT AND TRADEMARK OFFICE
CERTIFICATE OF CORRECTION

PATENT NO.        : 11,412,520 B2
APPLICATION NO.   : 16/915838
DATED             : August 9, 2022
INVENTOR(S)       : Zhang et al.

It is certified that error appears in the above-identified patent and that said Letters Patent is hereby corrected as shown below:

In the Claims

Claim 4: Column 39, Lines 66-67: "$N_{null} = (C \cdot R\ B)$, $C = \lceil B/R \rceil$, $r \in \{0, 1, ..., (R\ 1)\}$, and $c \in \{0, 1, ..., (C\ 1)\}$." should read -- $N_{null} = (C \cdot R - B)$, $C = \lceil B/R \rceil$, $r \in \{0, 1, ..., (R-1)\}$, and $c \in \{0, 1, ..., (C-1)\}$. --.

Signed and Sealed this
Twentieth Day of December, 2022

Katherine Kelly Vidal
*Director of the United States Patent and Trademark Office*